(12) United States Patent
Mintz et al.

(10) Patent No.: US 10,430,563 B2
(45) Date of Patent: *Oct. 1, 2019

(54) BLOCKCHAIN ENHANCED ENTITLEMENT CONTROL

(71) Applicant: Accenture Global Solutions Limited, Dublin (IE)

(72) Inventors: Kevin Matthew Mintz, Chicago, IL (US); Arthur R. Leinen, III, South Bend, IN (US); Melanie Jean Cutlan, Monument, CO (US); Richard Thomas Meszaros, Westworth Village, TX (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/209,559

(22) Filed: Dec. 4, 2018

(65) Prior Publication Data

US 2019/0108323 A1 Apr. 11, 2019

Related U.S. Application Data

(63) Continuation of application No. 15/899,169, filed on Feb. 19, 2018, now Pat. No. 10,176,308.

(Continued)

(51) Int. Cl.
*G06F 7/04* (2006.01)
*G06F 21/10* (2013.01)
*H04L 9/32* (2006.01)
*H04L 9/06* (2006.01)
*H04L 29/06* (2006.01)
*H04L 29/08* (2006.01)

(52) U.S. Cl.
CPC .......... *G06F 21/105* (2013.01); *H04L 9/0637* (2013.01); *H04L 9/3213* (2013.01);

(Continued)

(58) Field of Classification Search
CPC ... H04L 9/0637; H04L 9/3213; H04L 9/3236; H04L 9/3297; H04L 63/10; H04L 67/104; G06F 21/105

(Continued)

(56) References Cited

U.S. PATENT DOCUMENTS

2017/0116693 A1* 4/2017 Rae .................... G06F 21/64
2017/0178128 A1* 6/2017 Fourez ................ G06Q 20/38

(Continued)

FOREIGN PATENT DOCUMENTS

WO WO 2017/021154 2/2017

OTHER PUBLICATIONS

Vitalik Buterin, "A Next Generation Smart Contract & Decentralized Application Platform," Ethereum White Paper, dated 2014, pp. 1-36, ethereum.org.

(Continued)

*Primary Examiner* — Samson B Lemma
(74) *Attorney, Agent, or Firm* — Brinks Gilson & Lione

(57) ABSTRACT

Systems and methods for entitlement tracking and control with blockchain technology are provided. A server node may receive usage information indicating usage of a licensed component by a remote device. The server node may generate a datablock that includes the usage information and append the datablock to a blockchain. The server node may acquire, from the blockchain, a license smart contract. The license smart contract may include control logic to control access to the license component. The server node may control access to the license component by the remote device based on the usage information and the control logic.

20 Claims, 16 Drawing Sheets

Related U.S. Application Data

(60) Provisional application No. 62/492,042, filed on Apr. 28, 2017.

(52) U.S. Cl.
CPC .......... H04L 9/3236 (2013.01); H04L 9/3297 (2013.01); H04L 63/10 (2013.01); *H04L 67/104* (2013.01); *H04L 2209/38* (2013.01)

(58) Field of Classification Search
USPC .................................. 726/5, 9, 26; 713/168
See application file for complete search history.

(56) References Cited

U.S. PATENT DOCUMENTS

| | | | | |
|---|---|---|---|---|
| 2017/0331896 | A1* | 11/2017 | Holloway | H04L 67/12 |
| 2018/0025166 | A1* | 1/2018 | Daniel | G06Q 10/06 |
| | | | | 713/189 |
| 2018/0089256 | A1* | 3/2018 | Wright, Sr. | G06F 16/2379 |
| 2018/0096175 | A1* | 4/2018 | Schmeling | B29C 64/10 |
| 2018/0117446 | A1* | 5/2018 | Tran | A61B 5/0022 |
| 2018/0225466 | A1* | 8/2018 | Ducatel | G06Q 20/065 |

OTHER PUBLICATIONS

Jeff Herbert et al., "A Novel Method for Decentralised Peer-to-Peer Software License Validation Using Cryptocurrency Blockchain Technology," dated Jan. 27, 2015, pp. 27-35, CRPIT vol. 159—Computer Science 2015, Proceedings of the 38$^{th}$ Australasian Computer Science Conference (ACSC 2015), Sydney, Australia.
Examination Report No. 1 for Australian Application No. 2018202523, dated Jun. 14, 2018, pp. 1-4, IP Australia, Phillip, Australia.
Extended European Search Report in European Patent Application No. 18166807.0, dated Sep. 19, 2018, pp. 1-6, European Patent Office, Munich, Germany.

* cited by examiner

BLOCKCHAIN ENHANCED ENTITLEMENT CONTROL

CROSS REFERENCE TO RELATED APPLICATIONS

This application is a continuation of U.S. application Ser. No. 15/899,169, filed Feb. 19, 2018, which claims priority to U.S. Provisional Application No. 62/492,042, filed on Apr. 28, 2017, both of which are incorporated herein by reference in their entirety.

TECHNICAL FIELD

This disclosure relates to entitlement management systems and methods, and, in particular, to distributed ledger technology and hardware/software authentication.

BACKGROUND

Entitlements, especially those related to enterprise hardware and software, is complex. Present approaches to entitlement management of enterprise hardware and software lack a unified approach to creating, distributing, acquiring, and authorizing enterprise licenses, for instance. Whether it be sending a license-code with purchase, or a vendor/third party maintaining a database of named users with access, these solutions are disparate, implemented with countless variation, open to many vulnerabilities, and lead to confusion and complications for all parties involved. The lack of visibility of entitlement from vendor to reseller to customer, as well as within complex corporate structure, rises from disparate solutions and disconnected processes for acquiring and tracking entitlements. Computing systems devoted to authorizing use of hardware and/or software suffer from a variety of inefficiencies including lack of a cohesive and consistent source of authentication information corresponding to the entitlement. In addition, present approaches to entitlement management suffer from a variety of drawbacks, limitations, and disadvantages.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
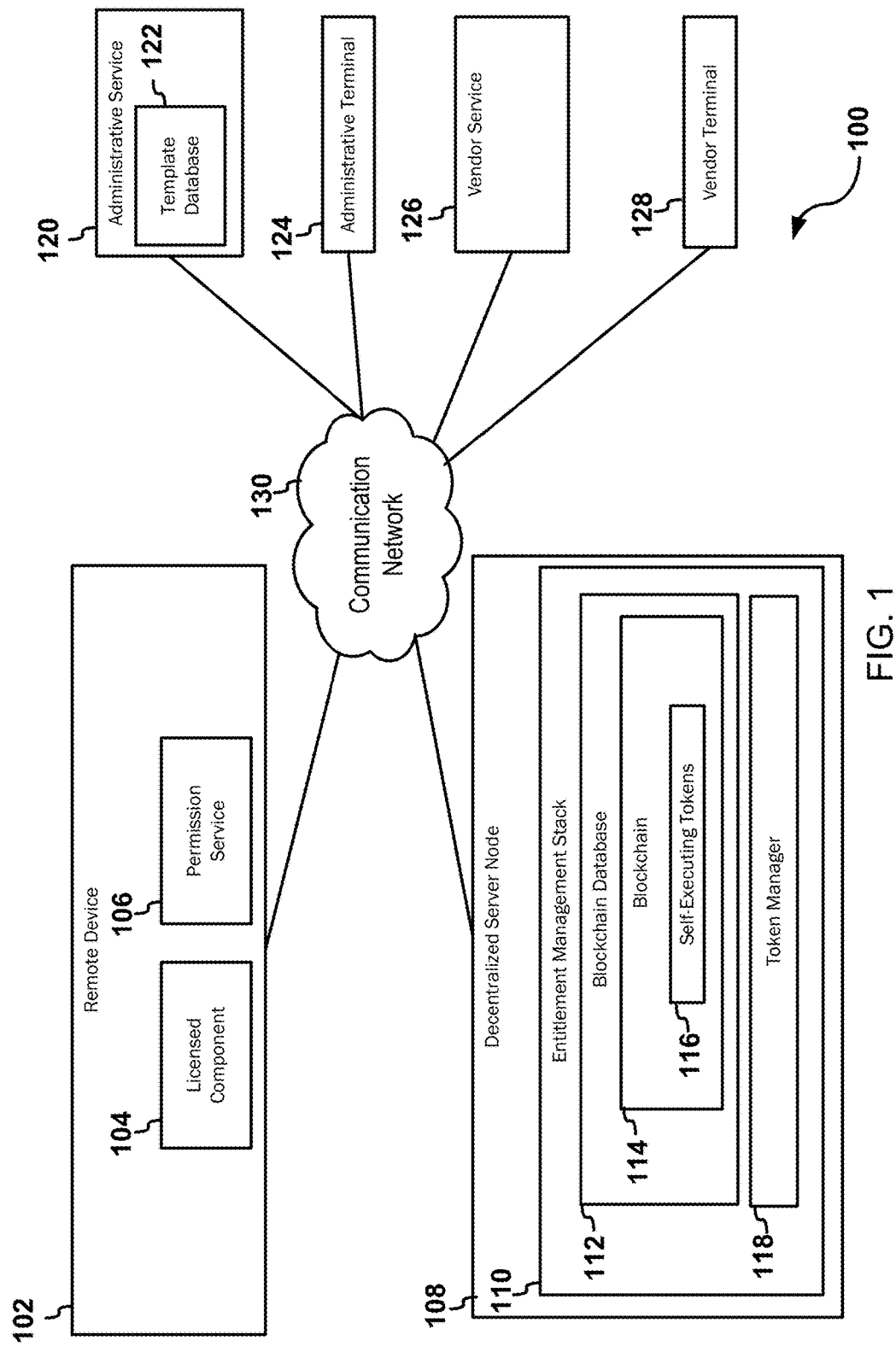
FIG. 1 illustrates a system for controlling access to a licensed component.

Systems and methods for managing and controlling software entitlements are provided. By way of introductory example, a server node for controlling access to a licensed component may receive a license creation message comprising a license creation parameter. The server node may acquire, from a blockchain, a license factory smart contract in response to receipt of the license creation message. The license factory smart contract may include license factory logic executable to generate a license smart contract. The server node may generate, based on the license creation parameter and execution of the licensing factory logic, the license smart contract. The license smart contract may include licensing logic executable to validate an access event corresponding to a licensed component configured on a remote device. The license smart contract may append a datablock to the blockchain that includes the license smart contract. The server node may synchronize the blockchain across a plurality of nodes. The server node may control access to the licensed component configured on the remote device by execution of the licensing logic.

One example of a technical advancement achieved by the systems and methods described below may be that inconsistences between multiple digital representations of license agreements stored in multiple systems are reduced by using blockchain technology. Rapid advances in electronics and communication technologies have resulted in a widespread adoption of secure data systems that employ cryptographically distributed secure data storage layers in the form of distributed ledgers, e.g., blockchains. Among many practical applications, a blockchain facilitates information sharing and asset management. The secure authorization and control of use of licensed hardware and software according to mutually agreed upon agreements is improved because blockchain technology reduces inconsistent and/or out-of-date agreements for enforcing the secure authorization.

Another example of the technical advancement achieved by the system and methods described below is that control of the secure use of licensed hardware and software may be automated in a transparent manner that is agreed between one or more parties. For example, entitlements for hardware or software may be represented as self-executing tokens included in the blockchain. The blockchain may allow tangible assets to exist in the digital realm while providing the benefits of real-world trade plus the benefits of a digital architecture. Just like tangible items, licenses may seamlessly change hands between companies, vendors, resellers, users, etc. By creating a self-executing token enabled by one or more smart contracts, rules like expiration, usage permissions, tracking, and overall Enterprise Agreements may be built in as embedded self-executable logic. Through this approach, parties may employ a many-to-many approach to share a source of accurate, up-to-date, and complete entitlement information across any participating vendors and customers. Because the smart contracts are stored on a distributed ledger, the logic accessed from the smart contracts and used to control access to the software and hardware may be agnostic to the hardware infrastructure utilized by the participating vendors and customers. Thus, instead of each participating vendors and customers implementing a separate set of rules and logic to enforce an enterprise agreement, the distributed blockchain may include self-executing logic that is consistent between the participating vendors and customers.

Alternatively, or in addition, another example of the technical advancement achieved by the system and methods described below is increased accessibility, transparency, and consistence of stored license agreements and executable logic that controls access hardware and software. For example, by leveraging the transparency of the blockchain, vendors may know who's using their platforms and to let companies see the full terms of their licenses, all without heavy administrative costs on either end. This shared distributed ledger for all entitlements may allow for an immutable record of license ownership and authorization as well as for an auditable history. Systems and methods described herein reduce and/or eliminate processing time previously devoted to ensuring data consistency for license agreements. In addition, the systems and methods significantly reduce logic configured to enforce the license agreement.

Another interesting feature of the systems and methods described below may be that the blockchain may power many overlaying applications, including an enterprise software transaction service. For example, the software transaction service can allow employees of an enterprise to license software from a curated catalog of authorized acquisitions including existing enterprise agreements. With data from the blockchain, this solution enables analytics and targeted recommendations to guide procurement decisions. This enterprise software transaction service may also allow centralized electronic transactions. As described below, this may be accomplished by deploying a private/hybrid blockchain, providing APIs to overarching applications for each entity involved, and administrative web applications for managing licenses. The web application may provide an interface to design and deploy smart licenses to the blockchain, creating instantaneous smart contracts with logic configurable through those interfaces. Those smart licenses may then be deliverable and executed throughout the underlying blockchain. In some examples, user access to software/hardware and entitlements may be governed by a software development kit (SDK) deployed into the application or an application that communicates with the blockchain itself, enabling access for those in possession of or delegated by a valid smart license.

The systems and methods described herein offer other improvements over existing market solutions. The additional benefits, efficiencies, and improvements over existing market solutions are made evident in the systems and methods described below.

FIG. 1 illustrates a system 100 for controlling access to a licensed component.

Remote Device

The system 100 may include a remote device 102. The remote device 102 may include an electronic computing device. For example, the remote device 102 may include a server, a mobile device, a personal computer, a workstation, circuitry and/or any other type of one or more computing devices. The remote device 102 may store, execute, control, or communicate with a licensed component 104. The licensed component 104 may include software, hardware, or a combination of software and hardware in which access, usage rights, ownership, and/or permissions corresponding to the licensed component 104 are governed by an agreement. For example, the licensed component 104 may include software, such as an application, that is installed on the remote device 102 and/or executing on the remote device 102. Alternatively or in addition, the licensed component 104 may include software that is packaged for installation on the remote device 102, such as compressed as a ZIP (or some other compression standard) prior to installation. In other examples, the licensed component 104 may include hardware that is connected with the remote device 102. Non-limiting examples of the licensed component 104 include, for example, a mobile application, an operating system, a web-page, and/or a suite of programs, a USB device, a Bluetooth device, a networking device, or any other type of device and/or software. Alternatively or in addition, the licensed component 104 may include software and/or hardware that is configured outside of the remote device 102 and accessed by the remote device 102 for execution and/or for display. For example, the licensed component 104 may include logic, such as HTML, JavaScript, or any other type of executable information, loaded by the remote device 102 from a source remote to the remote device 102.

The remote device 102 may further include a permission service 106. The permission service 106 may control access to and/or operation of the licensed component 104. For example, the permission service 106 may receive communications from a remote location and control access to and/or operation of the licensed component 104 based on the communications. As described herein, access to the licensed component means installation of a software and/or hardware component; communication with the hardware and/or software component; and/or interaction with the software and/or hardware component in any way. The access to the licensed component 104 may be performed or initiated by machine or human-based communication external to the licensed component 104 and/or by the licensed component itself. Controlling access to the licensed component 104 may include prohibiting or permitting installation and/or launch of an application. Alternatively or in addition, controlling access to the licensed component 104 may include prohibiting or permitting the ability to engage one or more features provided by the licensed component 104. In other examples, controlling access to the licensed component 104 may include prohibiting or permitting the ability to execute all, or a portion of, the executable instructions included in or provided by the licensed component 104.

As illustrated in FIG. 1, the permission service 106 may be external to the licensed component 104. In other examples, the permission service 106 may be included in the licensed component 104. For example, the permission service 106 may be integrated with the licensed component 104. Accordingly, the licensed component 104 may control access to itself. In other examples, the permission service 106 may be included in installers or software hosts, such as web browsers, that load software from external sources. Alternatively, the permission service 106 may be located external to the remote device 102 and in communication with the remote device 102 to control access to the licensed component 104.

The permission service 106 and/or the licensed component 104 may collect and/or communicate usage information related to the licensed component 104. The usage information may include information related to the use of the licensed component 104. For example, the usage information may include events that log installation, uninstallation, launch, close, and/or download of the licensed component 104. Alternatively or in addition, the usage information may include information descriptive of the time at which the licensed component 104 is used, the amount of time the licensed component 104 is used, the location, such as a geographic location, where the licensed component 104 is used, and/or any other information related to the circumstances or manner in which the licensed component 104 is used. In other examples, the usage information may include interactions, or attempted interactions, with features provided by the licensed component 104, such as buttons, lists, dropdowns, etc., in a graphical user interface. In other examples, the usage information may be descriptive of logic executed or requested to be executed by the licensed component 104. In general, the usage information may include information descriptive of any kind of attempted or actual interaction and/or communication with the licensed component 104.

The licensed component 104 may be associated with an agreement that governs the use of licensed component 104, or features of the licensed component 104. For example, the licensed component 104 may be associated with a contract, such as a license agreement, which grants certain rights and obligations to users of the licensed component 104. Among other features described herein, the creation, ownership, enforcement, and management of the license may be managed by the system 100 using, among other features, a decentralized and secure blockchain platform.

Decentralized Server Node

The system 100 many include a decentralized server node 108. The decentralized server node 108 may include an entitlement management stack 110. The entitlement management stack 110 may comply with a protocol for inserting, deleting, validating, or otherwise managing blockchains and for licensing information stored on blockchains. Accordingly, the entitlement management stack 110 may, among other features described herein, control creation, ownership, enforcement, and management of software licenses, or other types of agreements, in a decentralized and secure manner using blockchain technology. The entitlement management stack 110 may include a blockchain database 112.

The blockchain database 112 may include a repository that stores and/or manages one or more blockchains. The blockchain database 112 may include data structures that comprise one or more blockchain. For example, the blockchain database may include linked sets of datablocks that form the one or more blockchain. In some examples, the blockchain database may include procedures that create, modify, and maintain the one or more blockchains. The blockchain database 112, and/or entitlement management stack 110, may synchronize one or more blockchains across other decentralized server nodes 108. Synchronizing the blockchain 114 may include sharing additions/modifications to the blockchain to other decentralized server nodes according to a blockchain protocol. The blockchain database 112 may prevent modification to previously appended or existing information in one or more of the blockchains. Alternatively or in addition, the blockchain database 112 may validate the blockchains using other decentralized server nodes. In some examples, modifications to the one or more blockchains may be prohibited unless a consensus, such as a majority or some other predefined number of nodes, of the other decentralized server nodes consents to the modifications. In other examples, additions and modifications to the one or more blockchains in the blockchain database 112 may be controlled according a blockchain protocol that defines standardized rules for managing and synchronizing blockchains.

The blockchain database 112 may include a blockchain 114. The blockchain 114 may include a ledger of information that is replicated across multiple distributed nodes to provide a distributed ledger. The blockchain 114 may include datablocks appended together to form the blockchain 114. The blockchain 114 may provide a growing, shared digital data flow, which serves as the source of truth between parties that access data stored in the blockchain 114. For example, the blockchain 114 may provide a chronological ledger of information. In an embodiment, one or more of the successive datablocks may include a hash of a previous datablock. Modifications to one or more datablocks in the blockchain 114 may cause inconsistencies in the hashed information stored in the successive datablocks. The inconsistencies may be detected and managed by the blockchain database 112 in concert with other decentralized server nodes.

In some examples, the blockchain 114 may be tailored for a particular purpose. For example, the blockchain 114 may provide a history of transactions related to entitlement of physical and/or virtual assets. The blockchain 114 may be tailored for managing virtual representations of a licensing agreement that contains and/or identifies ownership of and/or controls access to software and/or hardware. The blockchain 114 may include one or more self-executing tokens 116.

A self-executing token 116 may include a virtual representation of ownership of a tangible or intangible property, such as software or hardware. In some examples, the self-executing token 116 may include logic that programmatically determines whether the rights or obligations of an entitlement, such as a licensing agreement, are fulfilled. Alternatively or in addition, the self-executing token 116 may include logic that controls access to the property based on the determined fulfillment (or lack of fulfillment) of the rights or obligations of the entitlement. In one example, the self-executing token may correspond to a virtual representation of a software licensing agreement, where the terms, conditions, definitions, and parties of the licensing agreement are digitally represented in the self-executing token 116. The self-executing token 116 may include logic that that controls launching, installing, engaging, and/or communicating with hardware and/or software licensed under the licensing agreement.

In other examples, self-executing token 116 may include rules for controlling ownership of itself, other self-executing tokens, or other tokens that do not include self-executing logic. For example, a self-executing token 116 may include rules for assigning the self-executing token between users and/or creating other self-executing tokens. In one example, the self-executing token 116 may correspond to a software-license agreement, for software which is licensed by a first party to a second party. The self-executing token 116 may include logic that determines whether such a transfer is valid according to terms and conditions of the software licensing agreement. Alternatively or in addition, the self-executing token 116 may include logic that controls access by the second party to download, install, and/or execute the software.

The self-executing tokens 116 may be stored on one or more blockchains. For example, when the self-executing tokens 116 are stored in the blockchain 114, unauthorized changes to the self-executing tokens 116 are minimized and easily detected. Authorized changes to the self-executing tokens 116 are recorded in the blockchain 114 such that the blockchain 114 provides an auditable record of all changes to the self-executing tokens 116 and/or to parties that authorized the changes. For example, the blockchain 114 may include a ledger of the history associated with one or more of the self-executing tokens 116. The self-executing tokens 116 may be modified and/or ownership of the self-executing tokens 116 may be transferred over time. In some examples, the blockchain 114 may include a history of transactions including updates to the ownership of the self-executing tokens 116 and/or modifications to the self-executing tokens 116. Thus, unlike traditional databases, the blockchain 114 may provide an immutable record of the token. For example, the blockchain 114 may provide a ledger of modifications and/or transfer of ownership to the token. In addition, the blockchain 114 may include the logic required for controlling access to software based on one or more of the self-executing tokens 116 stored in the blockchain 114.

The logic of the self-executing tokens 116 may be referred to as "self-executing" because the logic may be implemented by on one or more decentralized server nodes 108 and/or one or more remote devices regardless of the specific operating system, hardware, and/or other hardware or software constraints. Accordingly, the logic of the self-executing token 116 may be agnostic to hardware, operating system, and/or platform in which the logic of the self-executing token is evaluated or executed. Because the logic is stored in the blockchain 114, unauthorized changes to the self-executing logic are minimized and easily detected. Authorized changes to the self-executing logic are recorded in the blockchain 114 such that the blockchain 114 provides an auditable record of all changes to the self-executing logic and/or to parties that authorized the changes.

The entitlement management stack 110 may additionally or alternatively include a token manager 118. The token manager 118 may include an API, services, procedures, and/or any type of logic that can be initiated or triggered via interactions with, or within, the decentralized server node 108. In some examples, the token manager 118 may interact with the blockchain database 112. For example, the token manager 118 may provide an interface, such as an Application Programming Interface (API), for adding and updating information stored in the blockchain 114. Alternatively or in addition, the token manager 118 may provide an interface for determining if use of the licensed component 104 or features therein, is authorized based on one or more of the self-executing tokens 116 stored in the blockchain 114. Additionally or alternatively, the token manager 118 may provide an interface for sending and receiving usage information related to one or more licensed components that are licensed according to one or more of the self-executing tokens 116. Alternatively or in addition, the token manager 118 may provide an interface for determining whether the remote device 102 is authorized to launch the licensed component 104 and/or access various features of the licensed component 104 based on one or more of the self-executing tokens 116.

When the licensed component is either accessed, or attempted to be accessed, the token manager 118 may receive (or detect) an access event. The access event may include information descriptive of the access, or attempted access, to the licensed component 104. The access event may include, among other information, the time, location, and/or an access descriptor that describes the access event. In one example, the access to the licensed component may include installation of the licensed component on the remote device 102. In another example, the access event may include interaction with a feature, such as a launcher, of the licensed component 104. In general, the access event may include information indicative of any type of access to the licensed component described herein. The access event may be generated by the remote device 102, decentralized server node 108, and/or any device or component configured to monitor the access to the licensed component 104.

The token manager 118 may receive one or more access events corresponding to one or more licensed components. In some examples, the access event may be communicated to the token manager 118 via an access message. An access message may refer to information configured to communicate the access event. The access message may include, for example, an API call, a message sent via messaging service, a procedural call, etc.

In some examples, the self-executing token may be transferred between users. The users may include owners and/or assignees of the self-executing token. For example, the users may include the parties, licensees and/or assignees to a contract corresponding to the self-executing token. The token manager 118 and/or logic included in the self-executing token may control access to the licensed component 104 based on the transfer. For example, the self-executing token may have been previously assigned or associated with a first user identifier associated with a first user. The first user may have access to the licensed component 104. The self-executing token may be transferred to with a second user identifier associated with a second user. After the self-executing token is transferred, the first user may no longer have access to the licensed component 104 while the second user may have access to the licensed component 104. The blockchain 114 may maintain a record of transfer events related to the self-executing token. A transfer event may refer to any event where the self-executing token is reassigned, re-associated, and/or transferred between users. Detection of a transfer event may include detection of a procedural call and/or presence of particular data that signifies the transfer between users. The blockchain 114 may include one or more datablocks that include transfer information. For example, the transfer information may indicate that the self-executing token was transferred from the first user to the second user. The token manager 118 may add a datablock to the block chain that includes the transfer information in response to detection of a transfer event.

Administrative Service

The system 100 may include an administrative service 120. The administrative service 120 may provide user interfaces to end users and devices. The administrative service 120 may interact with the decentralized server node 108 in response to triggering operations communicated by or created by the user interfaces. In some examples, the administrative service 120 may communicate with the decentralized server node 108 to create, transfer, and or modify one or more of the self-executing tokens 116.

The administrative service 120 may include a template database 122. The template database 122 may include template information that is used to create, transfer, and/or modify one or more of the self-executing tokens 116. For example, the template database may include template logic and/or parameters for the self-executing logic. Template logic may include logic that may be combined with other parameters to complete the logic, e.g., to make the logic executable. Alternatively or in addition, the template logic may include placeholders that can be filled in to tailor the template logic for a particular purpose. In one example, the template logic may include "Restrict access to software after Y years" where Y is a placeholder in the template logic. The administrative service 120 may receive one or more template parameters that are combined with the template logic to generate a self-executing token. For example, the administrative service 120 may provide a user interface to the administrative terminal 122 that includes template logic and one or more template parameters. The administrative terminal 122 may select any combination of template parameters and template logic. The administrative service 120 may generate the self-executing token based on the selected template parameters and template logic. In another example, the template logic may include "User X is authorized to access the licensed USB device", where the placeholder X may be replaced with a particular username and/or represented by a private key controlled by the user.

In some examples, an administrative terminal 124 may communicate with the administrative service 120. The administrative terminal 124 may receive and display user interfaces for creating the self-executing tokens 116. The user interfaces may be accessible by users having certain permissions, such as administrative permissions. In other examples, the administrative terminal may receive other requests to initiate a transfer of a self-executing token. For example, the administrative service 120 may communicate a request to transfer the self-executing token from a first user to a second user. The decentralized server node 108 may update the blockchain 114 based on the request.

Vendor Service

The system may further include a vendor service 126. The vendor service 126 may provide virtual assets, such as assets available for purchase. The virtual assets may include the self-executing tokens 116. Access, usage, control, and ownership of virtual assets may be governed by one or more of the self-executing tokens 116 stored in the blockchain 114. The vendor service may notify the decentralized server node 108 that a user and/or device are purchasing, requesting access to, or accessing one or more virtual assets. The token manager 118 may record the transfer of the one or more self-executing tokens between parties. For example, the token manager 118 may append one or more datablocks to the blockchain 114 that record the transfer of the self-executing token. Alternatively or in addition, the self-executing token may include logic that determines whether the transfer is valid. The token manager 118 may grant or deny the ability to transfer the self-executing token.

In some examples, the transfer of the self-executing token may correspond to a transfer, such as a sale, of hardware, software, and/or a license agreement. In one example, the administrative terminal 124 may communicate with the administrative service 120 to create a self-executing token. The self-executing token may be associated with a vendor. The administrative service 120 may interact with the decentralized server node 108 to append a datablock to the blockchain 114 that includes the self-executing token. The remote device 102, or some other device, may communicate with the vendor service to acquire and/or purchase access rights to the licensed component 104. The vendor service 126 may communicate with the decentralized node 108 to append an additional datablock to the blockchain 114 that records a transfer of ownership for the self-executing token from the vendor to a purchaser. The entitlement management stack and/or the permission service may control access to the licensed component 104.

The self-executing tokens 116, the usage information corresponding to one or more licensed component, and additional information related to the licensed component may be stored on one or more blockchains by the decentralized server node 108. Using blockchain technology, the one or more blockchains may synchronized across multiple nodes. Blockchain technology allows verifiable progression through a trusted workflow of multiple coordinated trusted and/or untrusted parties, with authorized checkpoints, and provable immutable audit logs. The validation of the one or more blockchains are decentralized.

The system may include a communication network. The communication network 130 may include any network that facilitates computer-based communication. The communication network may facilitate communication between one or more of the remote device 102, the decentralized server node 108, the administrative service 120, the administrative terminal 124, the vendor service 126, and/or the vendor terminal 128. Alternatively or in addition, the communication network 130 may facilitate communication between the entitlement management stack 110, the licensed component 104, and/or the permission service 106. In some examples, the communication network 130 may include an IP network. In another example, the communication network may include busses, memories, inter-process communications, or any other manner of computer communication.

The system 100 may be implemented with additional, different, or fewer components than illustrated in FIG. 1. For example, in some implementations, the system may include the decentralized server node 108 while the remote device 102, administrative service 120, administrative terminal 124, vendor service 126, and/or vendor terminal 128 may be included in an external system. Alternatively or in addition, the decentralized server node 108 and/or the entitlement management stack 110 may include additional or fewer components. For example, the decentralized server node 108 and/or the entitlement management stack 110 may also include the permission service 106, the administrative service 120, the template database 122, and/or the vendor service.

The system 100 may be implemented in many ways. While the example in FIG. 1 shows the entitlement management stack 110 separate from the remote device 102, other implementations are possible. In some examples, the remote device 102 may include the entitlement management stack 110. For example, multiple remote devices may collectively synchronize and/or validate a distributed ledger or otherwise participate in a distributed ledger environment. Alternatively or in addition, the licensed component 106 and/or the permission service 106 may include the entitlement management stack 110. For example, the licensed component may include software and/or hardware that includes the entitlement management stack 110.

Figure 2:
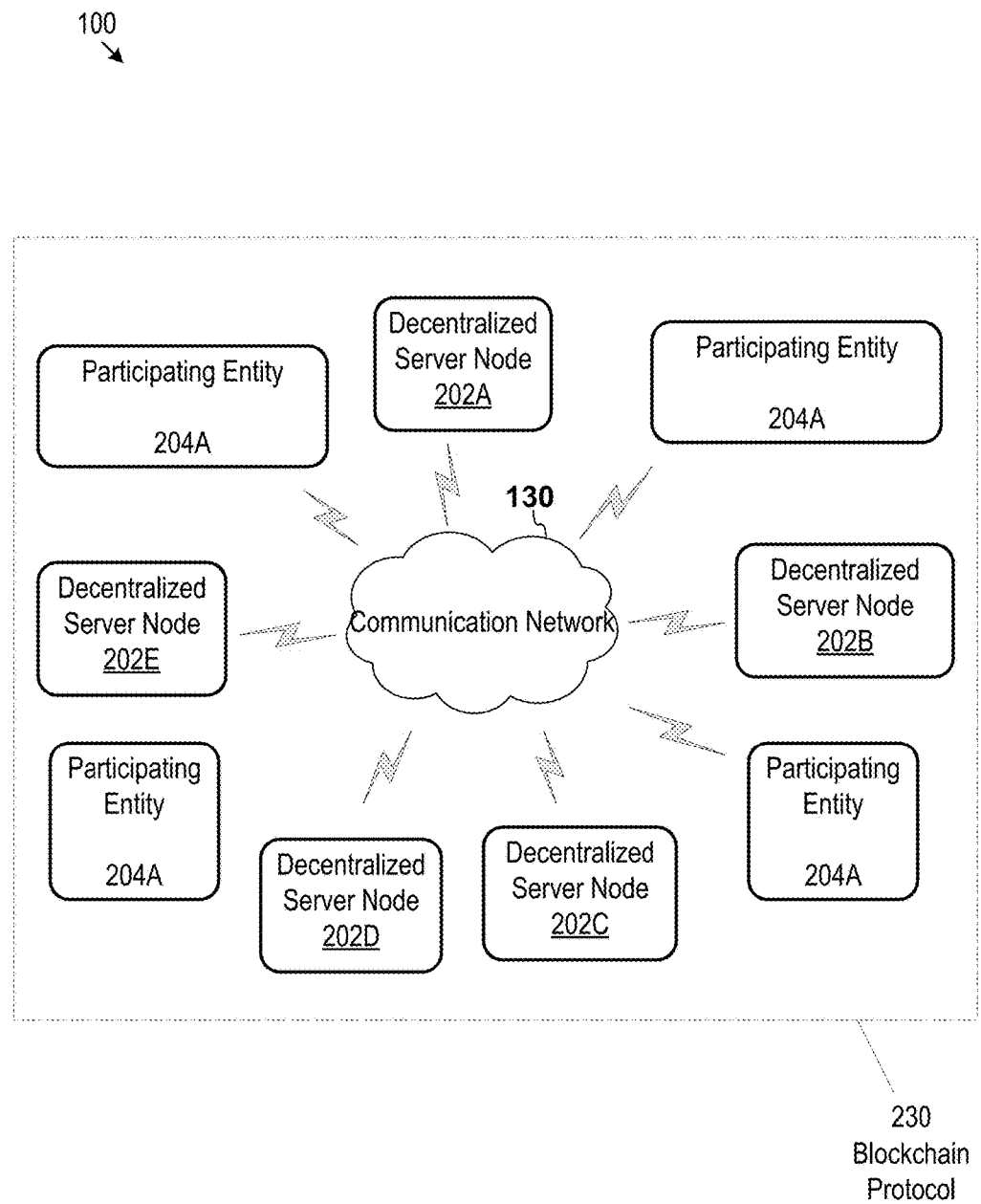
FIG. 2 illustrates an example of a system including decentralized nodes.

FIG. 2 illustrates an example of the system 100 including decentralized nodes 202A-E. The decentralized nodes 202A-E may communicate with each other via a communication network 201. The decentralized server nodes 202A-E may each include an implemented example of the decentralized server node 108 described in reference to FIG. 1.

The decentralized nodes 202A-E of the system 100 may be a combination of software and hardware for, e.g., storing, maintaining, updating, processing, and querying the secured data stored in a distributed mechanism such as blockchain. Each of the decentralized nodes 202A-E may be based on a single computer, a group of centralized or distributed computers, or a single or a group of virtual machines hosed by a cloud computing service provider.

Participating entities 204A-D may participate in the system 100 via the communications network. A participating entity may include one or more of the remote device 102, the administrative service 120, the vendor service 126, the administrative terminal 124, the administrative terminal 128, the decentralized server node 108, and/or any device which interacts with information stored in the blockchain 114 (FIG. 1). In one implementation, each of the decentralized server nodes 202A node of the system 100 may support one participating entity. In another implementation, each node may support multiple participating entities or multiple users of a participating entity. To become a decentralized server node of the system 100, one or more computers at the node may be installed with a blockchain software stack, such as the entitlement management stack 110. On the top of the software stack, an application layer may provide various blockchain functions, supported by the lower layers of the software stack. These functions may include, for example, encrypting data elements, submitting data elements for insertion into the blockchain, verifying data elements to be submitted to the blockchain, creating new datablocks in the blockchain via a consensus mechanism, storing a local copy of the blockchain, and/or other functions.

The configuration and functioning of the system 100 may be governed by a blockchain protocol 230. The blockchain protocol 230 may define how data elements are encrypted by the participating entities. The blockchain protocol 230 may further specify the format of the encrypted data elements such that the encrypted data elements may be decrypted and understood by the participating entities and nodes in the system. The blockchain protocol 230 may additionally specify the types of functions discussed above and how these functions should be carried out. The blockchain protocol 230 may additionally specify possible roles of a participating entity and node. For example, a blockchain node may participate as a full function node, capable of performing all blockchain functions. Alternatively, a blockchain node may only participate to perform one of subsets of the blockchain function. Each subset of block functions may contain one or more blockchain functions from the blockchain functions available. The possible subsets of blockchain functions may be specified in the blockchain protocol 230. A participating entity may choose one of the subsets and install a corresponding software stack for performing the functions included in the chosen subset. In another implementation, the blockchain protocol 230 may allow a participating entity to choose any combination of functions and configure its node accordingly rather than following one of the prescribed subsets by the blockchain protocol 230.

Figure 3:
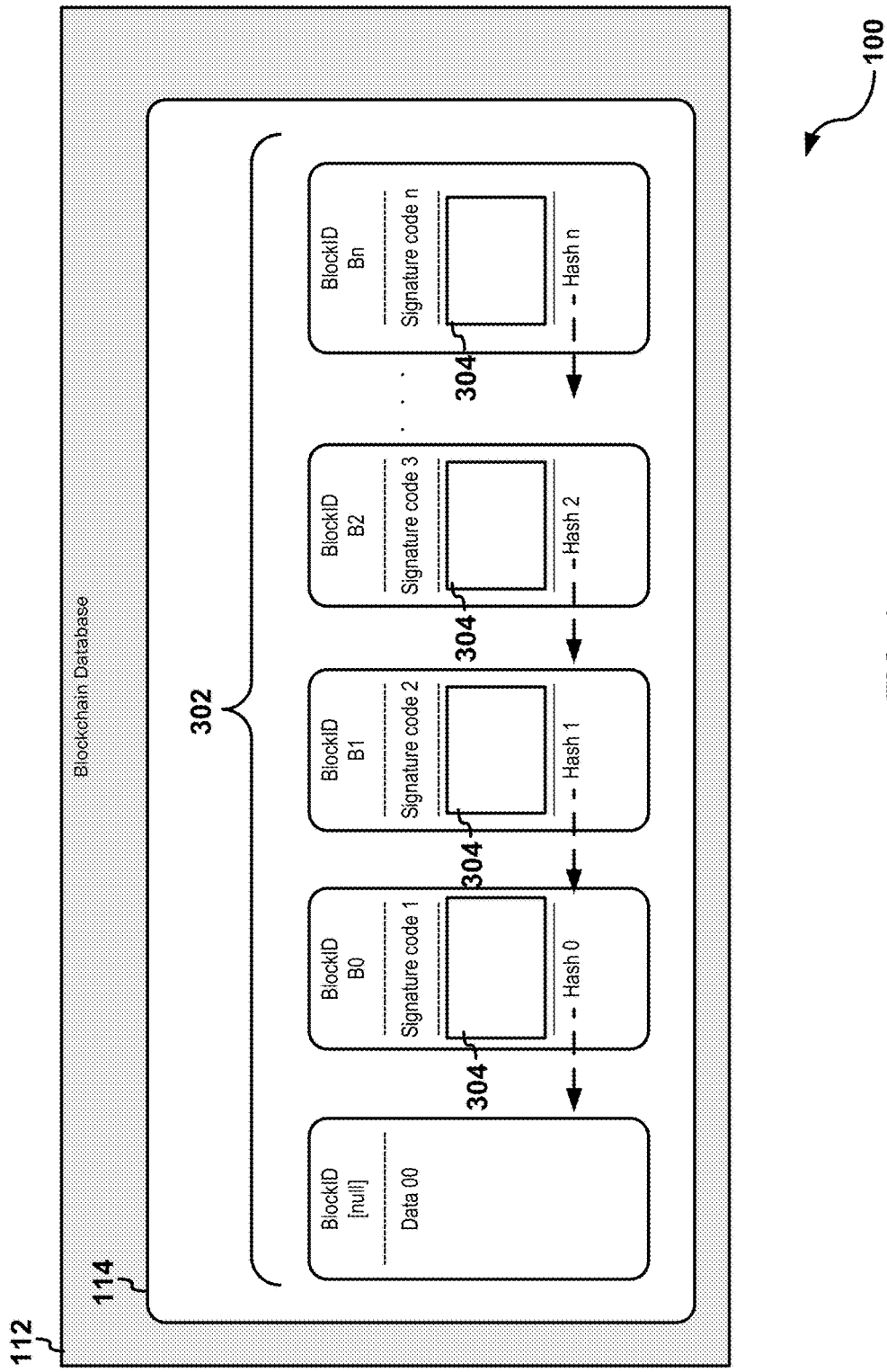
FIG. 3 illustrates an example of a blockchain.

FIG. 3 illustrates an example a blockchain 114 for the system 100. The blockchain 114 may include a series of linked datablocks 302 each uniquely identified by a block ID (B0, B1, B2, and Bn). Each of the datablocks may include a data element 304. A data element in a datablock may include any type of data that a participating entity wishes to store in the blockchain 114. A data element, for example, may be of a type that describes a relationship between entities, e.g., a monetary or service transaction based relationship between two parties. As another example, a data element may include computer instructions for automatically executing provisions of an agreement or contract embedded in the computer instructions. Data elements stored in the blockchain 114 and of this type may be referred to as executable data elements. For example, the data elements stored in the blockchain 114 may include, among other things, the self-executing token 116. As described in more detail below, execution of one or more segments of the computer instructions in an executable data element may be invoked by and from other data elements in the blockchain 114.

Authenticity of the data element 304 in each datablock may be achieved using various cryptographic technologies. For example, a digital signature based on public and private key cryptography may be used to ensure that a data element to be inserted into the blockchain 114 indeed comes from its proclaimed submitting entity. In particular, each entity participating in the system and who wishes to store data elements in the blockchain 114 may be in possession of a private key that is kept secret at all times. A public key may be derived from the private key and may be made publicly available. When the entity wishes to store a data element in the blockchain 114, the entity may first encrypt the data element using the private key before the data is submitted for insertion in the blockchain 114. The encrypted data element may be decrypted by anyone having access to the public key of the entity. Any tampering of the encrypted data may result in unreadable data when decrypted using the public key. As such, encryption using the private key represents a digital signature of the data element by the entity and any tampering of the encrypted data is easily detected.

Datablocks 302 of the blockchain 114 are sequentially created and are linked into a chain. In one example implementation, and as shown in FIG. 3, the linkage between a datablock and its immediately previous datablock may be a hash value rather than a traditional pointer in a data structure. In particular, a datablock may be linked to its immediate previous datablock by including a hash value, referred here in as a linkage hash value, of the datablock in the immediately previous block. In FIG. 3, for example, the hash value of the block B0, Hash 1, may be included in datablock B1 immediately following block B0 as a linkage hash value. As such, datablock B1 is linked with datablock B0. The algorithm used for calculating the hash value of the data elements contained in a block, for example, may be based on but is not limited to SHA256 hashing.

As shown in FIG. 3, each datablock of the system containing data elements may further be signed using a signature code. A signature code may alternatively be referred to as a nonce and/or hash. The signature code of a datablock is determined and/or used to help detect tampering of the datablock according to the blockchain protocol 230 (FIG. 2). For example, a datablock signature code may be considered valid according to the blockchain protocol 230 when a hash value of a combination of the signature code and the data elements in the datablock contains a hash section with a predefined hash pattern. The predefined hash pattern may be specified by the blockchain protocol (e.g., a predefined number of leading zeros at the beginning of the hash value). Thus, the signature code for a block may be calculated by solving a difficult cryptographic problem. In the example implementation above, the signature code may be calculated such that the hash value of the combination of the calculated signature code and the data elements complies with the signature protocol. For example, signature code 1 for block B0 is calculated such that the SHA256 hashing of the combination of the signature code 1, the data element of the datablock labeled B0 is compatible with the block signature protocol, e.g., leading by the predefined number of zeros. Any tampering of data in a signed block results in a hash value for the block that is incompatible with the signature protocol.

The blockchain 114 may be created by appending datablocks one at a time. Specifically, the encrypted (or digitally signed) data elements from various nodes of the system may be broadcast to the system. These encrypted data elements may then be collected into a datablock for storage into the blockchain 114. The blockchain protocol 230 may specify a consensus algorithm or mechanism. The consensus algorithm may govern how new data elements are verified, how a new datablock is assembled from the verified new data elements, and how the new block is broadcasted to the blockchain nodes, checked and accepted into the blockchain 114.

In one example consensus algorithm, data elements submitted from the nodes may be collected periodically, e.g., every 10 minutes or roughly a time period needed for solving a block signature code by the blockchain nodes. Further, various nodes may participate in verifying these data elements according to data element verification rules specified by the blockchain protocol 230. For example, the verification rules may include verification of data elements that are digitally signed, determination of whether to assemble the data elements into a block, calculation of a signature code or hash for the data block, and/or determination of whether to broadcast a new block to the system for acceptance. In one implementation, the first node that broadcasts an acceptable block will be responsible for inserting its block into the blockchain. The copies of the blockchain in various nodes are updated with the new block. This particular algorithm for having to solve the signature code, sometimes referred as "proof of work" is only one example of possible consensus algorithms. Other consensus algorithms, such as "proof of stake", may be used by the blockchain nodes for verifying and creating new datablocks. The insertion of a data item embedded in its datablock and inserted into the blockchain 114 is alternatively referred to as linking the data item in with the blockchain 114.

The functions of the system, e.g., encrypting and submitting data elements, consensus functions (including verification of data elements, calculation of signature code, and assembly of a new datablock), and storing local copy of the blockchain 114, may be performed by various nodes. The nodes that participate in the consensus algorithm, for example, may be referred to as miners. As described previously, a node, when participating in the system, may decide the subset of functions that the node may perform by installing a corresponding software stack. A full function node, for example, may perform all the functions discussed above. A node of limited functions, however, may only perform the chosen set of functions. Some nodes, for example, may only participate in encrypting and submitting data elements into the blockchain 114.

As discussed above, data elements in a datablock of the blockchain 114 may be of any type of data that a participating entity wishes to store in the blockchain 114, including the special type of executable data elements (or smart contracts). The blockchain protocol 230 (230 of FIG. 1) may prescribe mechanisms and interfaces for invoking all or part of the executable computer instructions in an executable data element from other data elements. For example, an executable data element may include sections of instructions that may be independently invoked. Each of these executable data elements may be identifiable by an ID and each section of instructions within an executable data element may further be identified by a section ID.

The execution of all or a section of an executable data element may be invoked in various ways and under various timing scenarios. In one example implementation, the blockchain protocol 230 may provide a mechanism for invoking the execution of a section of instructions in an executable data element from another data element when the other data element is inserted into a new datablock and the new datablock is verified and appended to the blockchain 114 by one of the nodes. An invocation interface may be provided in the invoking data element in accordance with the blockchain protocol 230 for specifying, e.g., the ID of the executable data element, the ID of the specific section of instructions within the executable data element to be executed, and parameters to be passed to the executable instructions.

In the context of information sharing in blockchain and in many other blockchain applications, a participating entity may desire to query the blockchain 114 for information. For example, one of the collaborating vendors of licensing information may need to search for licenses related to products supplied by the vendor. For a typical blockchain system, it is normally straightforward to fetch a particular data element from the blockchain 114 if the data ID and/or the block ID for the datablock containing the particular data element is known and is used as a query key. The returned data element may then be decrypted using appropriate public key, and if the data payload is proprietary it may be further decrypted by the querying entity. Alternatively or in addition, a secluded decrypt may be preformed before the query followed by a re-encrypt before returning the list of ID(s) or data element. The ID(s) or data element may be decrypted externally.

In some other implementations, information about the entire collection of data elements in the blockchain 114 may be extracted and tracked as the datablocks are being appended to the blockchain 114 in the form of a separate database such as a relational database that may be queried more efficiently using traditional database query processes.

Figure 4:
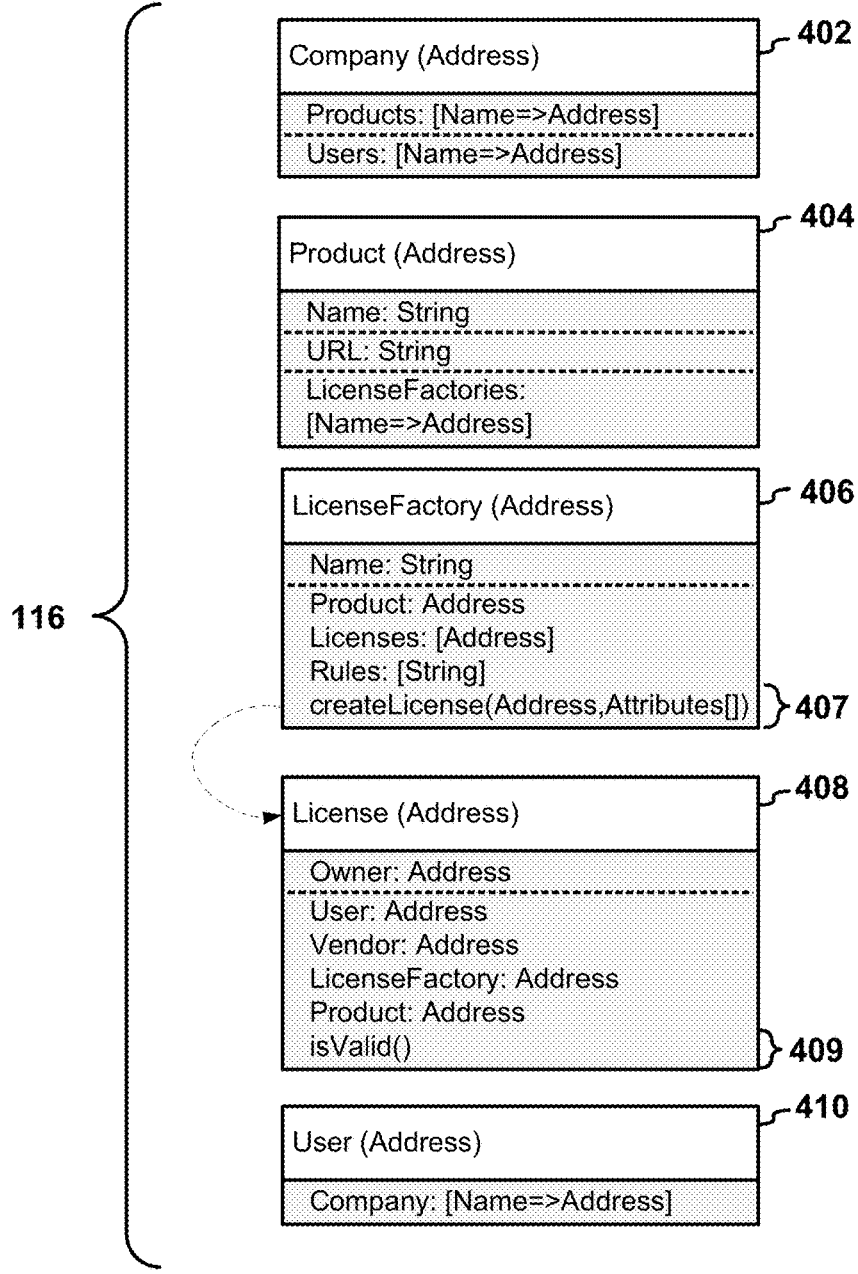
FIG. 4 illustrates examples of self-executing tokens.

FIG. 4 illustrates examples of the self-executing tokens 116 for the system 100. In some examples, the self-executing tokens 116 may be tailored for a particular purpose. For example, self-executing tokens 116 may be tailored to enforcing, implementing, and monitoring the rights and obligations that arise under one or more licensing agreements. Alternatively or in addition, one of the self-executing tokens 116 may be configured to manage other self-executing tokens 116 including, for example, the creation and enforcement of license agreements.

The self-executing tokens 116 may include one or more smart contracts. A smart contract may include logic and information organized under a protocol that facilitates, verifies, and/or enforces the negotiation or performance of an associated agreement between parties and/or the intentions of a single party. The smart contract may include parameters that constitute the definitions and terms of the associated agreement. The smart contract may include rules, instructions, and/or logic that is executable to control, enforce, and carry out the rights and/or the obligations agreed upon by one or more parties. Alternatively or in addition, the smart contract may include self-executing logic that detects information, performs computer-implemented actions, or responds to events in any way that is proposed or agreed upon between one or more parties.

The self-executing tokens may include, for example, a company smart contract 402, a product smart contract 404, a license factory smart contract 406, a license smart contract 408, and a user smart contract 410. In other examples, the smart contracts may be represented by fewer or greater numbers of smart contracts.

The company smart contract 402 may include an example of a smart contract for a company that develops, licenses, and/or provides software products. The company smart contract 402 may include company data fields. The company data fields may include information related to a company and/or other information used in the management of license agreements for products that arise from the company. For example, the company data fields may include a name of the company (e.g. MICROSOFT), references to user identifiers associated with the company, and/or references to the addresses of product smart contracts. The data fields of the company smart contract 402 may additionally include any other information related to or descriptive of the company, including the types of products (E.G. OFFICE, WORD, etc.) the company creates, sells, publishes, or otherwise makes available. The company logic may include self-executing logic configured for the administration of information, products, and/or licenses provided by or associated with the company smart contract 402. For example, the company logic may include logic to download, install, or access a product, such as a software application, provided by the company and/or acquired by the company. Alternatively or in addition, the company logic may include logic to create one or more product smart contracts and/or license factory smart contracts.

The product smart contract 404 may include information and/or logic related to a product and/or product line. For example, the product smart contract may include a license structure, logic associated with controlling access or payments, attributes/labels, variable values, rules/limitations/restrictions, prices, expirations, etc. Alternatively or in addition, the product smart contract 404 may include product data fields descriptive of a software program and/or an application that is executable on one or more remote systems. The product data fields may include, for example, a name of the product and/or a web address for the product, and/or identifying information related to the product. The product data fields may additionally include references to license factories associated with the product smart contract 404. In other examples, the product smart contract 404 may include logic related to the product, including a software API corresponding to the product, instructions for accessing the product and/or executable instructions for installing software associated with the product. Alternatively or in addition, the product smart contract 404 may include product logic that creates one or more license factory smart contracts.

The license factory smart contract 406 may include data fields and logic related to, among other things, creating and/or managing license smart contracts. The license factory smart contract 406 may include parameters such as a reference to a product and/or references to one or more license smart contracts. In addition, the license factory smart contract 406 may include license factory logic 407. The license factory logic may include an example of self-executing logic. The license factory logic 407 may include any logic that dictates, manages, and/or creates one or more license smart contracts 408. In some examples, the license factory smart contract 408 may include a plurality of predetermined rules, attributes, and/or logic that was previously selected and used to generate one or more licensing contracts. Thus, execution of the license factory logic may generate one or more license smart contracts 408 that includes predetermined logic, rules, and/or attributes. Each license smart contract 408 may correspond to one or more licensed components (see FIG. 1). In some examples, the license factory logic 407 may include template logic that may be combined with other logic to define one or more rules of the license smart contract 408. In some examples, the template logic may include one or more placeholders. A placeholder may include a portion of the template logic that may receive parameters. For example, the placeholder may be replaced, combined, and/or augmented with one or more parameters to generate the license smart contract 408. In some examples, the license factory logic 407 may provide logic that performs the following pseudo logic:

Grant access as long as records within related smart contracts and/or ownership of a token reflect that the user and/or company possesses the rights and meet other specified criteria.

Restrict access if an X1 amount of time has passed unless a condition X2 occurs.

Restrict access if a subscription condition is not met, such as a fee for the subscription period not being paid in full.

Grant access when predetermined external conditions are met, for example grant access if access is requested in a predetermined Y location.

Permit the license smart contract to be transferred such as from X entity to Z entity with or without meeting predetermined conditions.

Grant access to a product, such as exclusive access, to entity X1 for a predetermined period, such as two weeks, then return access to X2.

The license factory logic 407 may be combined with licensing parameters or creation parameters to create the license smart contract 408 and/or self-executing included in the licensing contract. For example, the license factory logic 406 may include "Restrict access if X1 amount of time has passed unless X2 happens", the licensing parameter X1 may include "1 year" and the licensing parameter X2 may include "a contract renewal." Additionally or alternatively, the license factory logic 407 may be combined with usage data to create licensing logic. For example, the macro "Grant access if access is requested in Y location" may be combined with usage data indicated by Y.

The license factory smart contract 406 may create, among other things, one or more license smart contracts, such as license smart contract 408. The license smart contract 408 may be an example of a smart contract with attributes and logic related to managing and/or maintaining a license agreement. The license smart contract 408 may represent a self-executing token that permits or restricts access to the licensed component 104. In some examples, the ownership of the license may be permitted to change while the logic of the smart license may be restricted from being updated.

The license smart contract 408 may include licensing logic 409. The licensing logic 409 may be created by the license factory smart contract 406. For example, when the license factory smart contract 406 creates the license smart contract 408, the license factory smart contract 406 may configure the licensing logic based on license factory logic 407. In some examples, the license factory logic 407 may combine creation parameters with template logic to generate the licensing logic 409

In general, the licensing logic 409 may provide, among other things, an indication of whether the license is valid, active, and/or usable based on current constraints. Alternatively or in addition, the licensing logic 409 may determine whether to grant access to the licensed component 104. In some examples, the licensing logic 409 may cause access to the licensed component to be allowed or denied. For example, the licensing logic 409 may communicate messages with the remote device 102 that cause the remote device 102 to grant or deny access to the licensed component 104. Alternatively or in addition, the licensing logic 409 may perform logical operations and/or numeric calculations on usage data related to the application corresponding to the license smart contract 408.

The self-executing tokens 116 may be included in one or more datablocks of the blockchain 114. In some examples, a specific type of smart contract, and or combinations of various types of smart contracts, may be included in the blockchain 114 to achieve an implementation of a blockchain that is tailored for a particular purpose, such as managing entitlements. For example, the blockchain 114 may provide a ledger that may store and track the full license lifecycle in a universal vendor-agnostic manner. Logic embedded in smart contracts may dictate rules of preprogrammed, executable actions and terms and allow for distributed computing of activities like purchase, sales, checkout, loan, etc.

Figure 5:
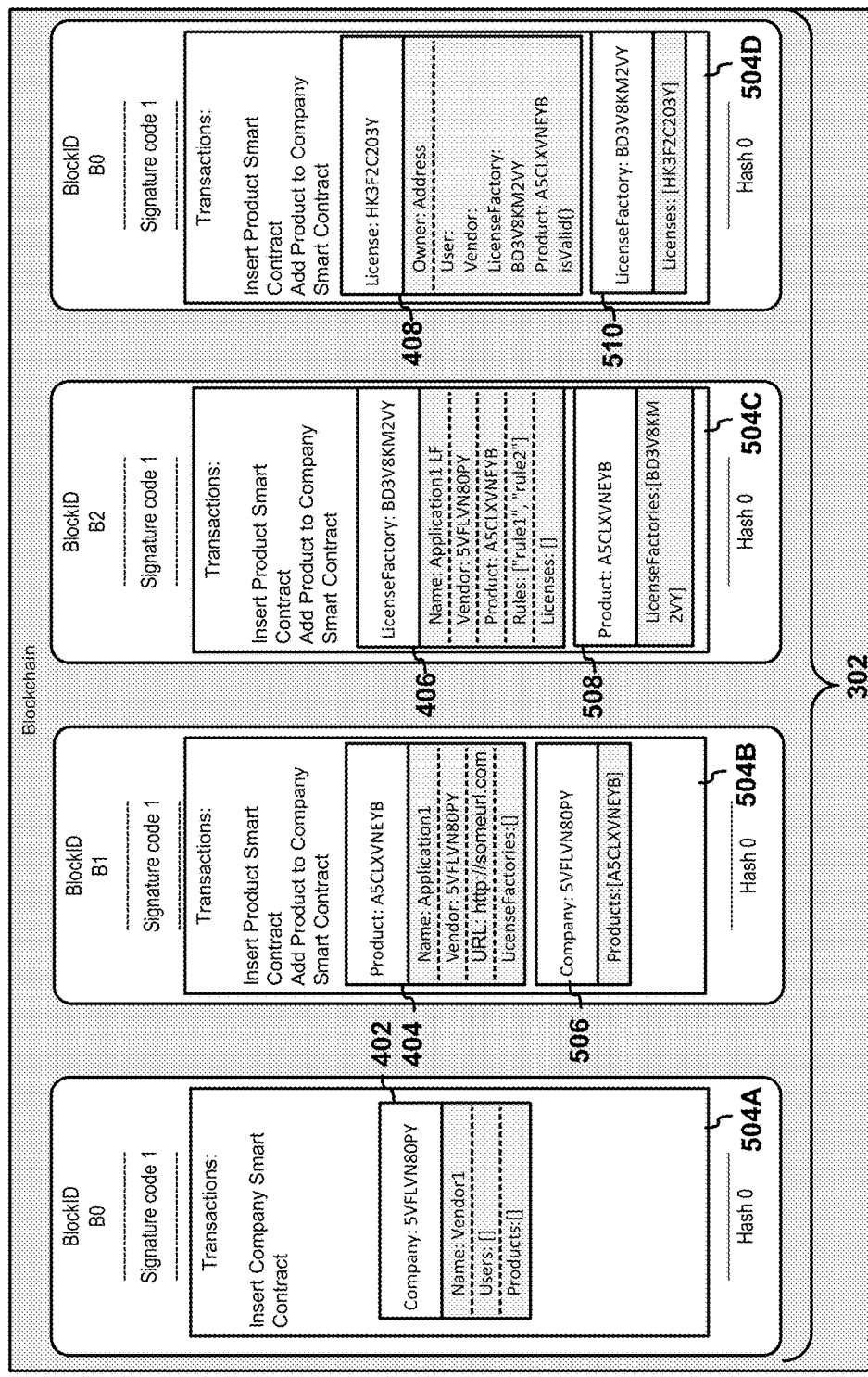
FIG. 5 illustrates an example implementation of a blockchain configured with self-executing tokens.

FIG. 5 illustrates an example implementation of the blockchain 114 configured with the self-executing tokens 116. The blockchain 114 may be configured to establish a transaction ledger related to licensing of one or more products, such as software products, or any other example of the license component 104. The blockchain 114 may accumulate identity data across any attribute, allow for decentralized validation, and selectively disperse this data to target entities with user approval. In addition, the blockchain 114 may facilitate and store transactions of value, assets, or accountability between two or more non-trusted parties. Furthermore, the blockchain 114 may store and recall the unequivocal latest state of a data record, source of truth—either public or obfuscated.

The datablocks 302 may include information related to creation, modification, and/or other type of interaction with the smart contracts. For example, when a self-executing token is created, updated, or otherwise modified, one or more datablocks may be added to the blockchain 114. The datablock may include the self-executing token and/or modification information related to the self-executing token. Alternatively or in addition, the datablock may include a copy of a self-executing token that is modified in a particular manner.

By way of example, as illustrated in FIG. 5, the blockchain 114 may include the datablocks 302. The datablocks 302 may include data elements 504A-D. A first datablock, labeled B0 in FIG. 5, may comprise the genesis block of the blockchain 114. Alternatively, the first datablock may be linked with the genesis block or be positioned after one or more other datablocks in the blockchain 114. The first data element 504A of the first datablock may include transaction information indicating that the company smart contract 402 was created. Alternatively or in addition, the first data element 504A may include the company smart contract 402 (or multiple company smart contracts).

The blockchain 114 may include a second datablock. As illustrated in FIG. 5, the data element 504B of the second datablock may include a transaction indicating that the product smart contract 404 was inserted in the blockchain 114. Any number of second data blocks may be included in the blockchain 114.

Alternatively or in addition, the second datablock, labeled B1 in FIG. 5, may include company update information 506. The company update information 506 may include updates to the company smart contract, the validity of the company smart contract, and/or the ownership of the company smart contract. For example, as illustrated in FIG. 5, the company update information 506 may indicate that the company smart contract 402 is updated to include a reference to the product smart contract(s) 404 included in the second datablock(s). Accordingly, by identifying the first datablock and the second datablock in the blockchain 114, a current version of the company smart contract 402 may be obtained. To limit the search time required to identify all the blocks that include information related to the company, the second datablock may include an updated copy of the company smart contract 402. In other examples, the company update information may be included in a separate datablock.

The blockchain 114 may include one or more datablocks that store one or more license smart contracts 408. Referring to FIG. 5, the data element 504C of the third datablock labeled B2 may include a transaction indicating that a license factory smart contract 406 was created and added to the blockchain 114. Any number of third datablocks may be included in the blockchain 114 corresponding to various license factories. Alternatively or in addition, the third datablock may include product update information 508 that indicates an update to the product smart contract 404 and/or ownership of the product smart contract. For example, the product update information may indicate that the product smart contract 404 is updated to include a reference to the license factory smart contract 406 included in the third datablock. In some examples, the third datablock may include a respective copy of the license factory smart contract 406 that was created and a copy of the product smart contract 404 that was updated. In other examples, the product update information may be included in a separate datablock.

As the license factory smart contract 406 is used to generate additional license smart contracts, the license smart contracts may be added to one or more datablocks that are appended to the blockchain 114. For example, referring to FIG. 5, the data element 504C of the fourth datablock labeled B3 may include a transaction indicating that the license smart contract 408 was created and added to the blockchain 114. Any number of fourth datablocks may be included in the blockchain 114 corresponding to various license smart contracts corresponding to the license factory smart contract 406.

Alternatively or in addition, the fourth datablock (or another datablock in the blockchain 114) may include license factory update information 510. The license factory update information 510 may include updates to the license smart contract 408. For example, the license factory update information 510 may indicate that the license factory smart contract 406 is updated to include a reference to the license smart contract 408 included in the fourth datablock. In some examples, the fourth datablock may include a respective copy of the license factory smart contract 406 that is modified to include the reference to the license smart contract 408. In other examples, the license factory update information 510 may be included in a separate datablock.

In other examples, the additional and/or alternative datablocks may be included in the blockchain 114. For example, the blockchain 114 may include datablocks with transaction information related to license smart contracts. For example, as the license smart contract is updated or events related to the license smart contract occur, one or more datablocks may added to the blockchain 114. For example, the license smart contract 408 may include an assignment attribute related to ownership of the license smart contract. A datablock may be added to the blockchain 114 that includes information related to a change in the assignment attribute. In some examples, the datablock added to the blockchain 114 may include an updated version of the license smart contract 408. Alternatively, the datablock may include a record of an update.

Figure 6:
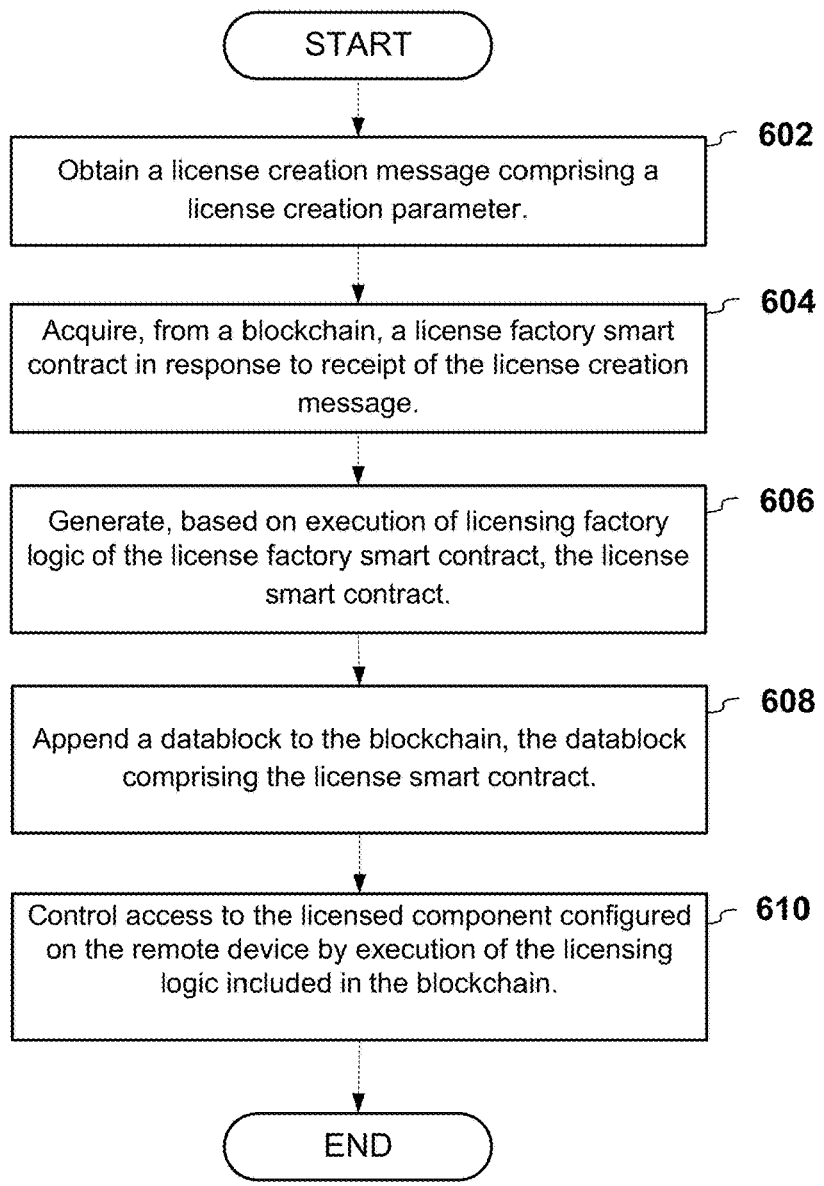
FIG. 6 illustrates an example of a flow diagram of logic for a system.

FIG. 6 illustrates an example of a flow diagram of logic for the system 100. The token manager 118 may obtain a license creation message comprising a license creation parameter (602). The license creation message may include a message, API call, or any other form of communication. The license creation message may include one or more license creation parameter. A license creation parameter may include information that is used to create the license smart contract 408. For example, the license creation parameters may include an identifier of the license factory smart contract 406 used to generate the license smart contract 408. Alternatively or in addition, the license creation parameters may include a digital representation of the terms, conditions, rights, obligations, rules, definitions, and/or other information included in an agreement. The license parameters may be combined with the license factory logic 407 to create one or more license smart contract.

The token manager 118 may acquire, from the blockchain 114, the license factory smart contract 406 in response to receiving the license creation message (604). The license factory smart contract 406 may include, among other things, the license factory logic 407 configured to create the license smart contract 408. In some examples, the license creation parameter and/or the license creation message may include a license factory identifier. The token manager 118 and/or the blockchain database 112 may traverse the blockchain 114 to identify the license factory smart contract 406 based on the license factory identifier. In some examples, the token manager 118 may identify a datablock in the blockchain 114 that includes the license factory smart contract 406 and/or the license factory logic 407.

The token manager 118 may generate, based on execution of the licensing factory logic 407, the license smart contract 408 (606). In some examples, the token manager 118 may combine the license creation parameter with the license factory logic 407 to generate the license smart contract 408 and/or the licensing logic 409. For example, the license factory logic 407 may include template logic that may be combined with the license creation parameter to generate the license smart contract 408 and/or the licensing logic 409. In one example, the license factory logic may include the following template logic. "Allow access if the licensed component is located is located within X miles of Y location." The license creation parameter may include a plurality of parameters, such as "100" corresponding to X and "Bangalore, India" corresponding to Y.

The token manager 118 may append a datablock to the blockchain 114, the datablock comprising the license smart contract 408 (608). The datablock may be located in the blockchain 114 after the license factory smart contract 406 and/or the genesis datablock of the blockchain 114. Subsequent datablocks may be added to the blockchain 114 after the datablock including the license factory smart contract 406. For example, one or more datablocks that include usage information and/or access events related to the licensed component 104 (or any other example of hardware and/or software) may be added to the blockchain 114. Alternatively or in addition, the one or more datablocks may include information related to transfers of ownership of the license smart contract 408.

The token manager 118 may control access to the licensed component 104 configured on the remote device 102 by execution of the licensing logic 409 included in the blockchain 114 (610). For example, the token manager 118 may receive the access message indicative of the access event corresponding to the application configured on the remote device 102. The access message may include an API call or a message sent to the token manager 118. Alternatively or in addition, the access message may include information used to identify the license smart contract stored in the blockchain 114. The identifying information may be used to identify the datablock that includes the license smart contract 408.

In some examples, the token manager 118 may communicate an access permission to the remote device 102. The access permission may include data used to determine permission rights. The access permission may govern whether the remote device 102 may access, launch, install, uninstall, or perform any kind of communication with the licensed component 104 and/or features provided by the licensed component 104. The access permission may specify information identifying a user, a machine, or an account associated with the user or the machine that is permitted or denied from accessing the licensed component 104. For example, the identifying information may include IP addresses, user names, account identifiers, and or any other identification of a human, machine, or account. In addition, the access permission may specify various features of the licensed component that are permitted or restricted. In one example, when the licensed component is an application, the access permission may specify that administrative features are denied while user-level features are enabled. The permission service 106 and/or the licensed component 104 may permit or restrict access based on the access permission.

Figure 7:
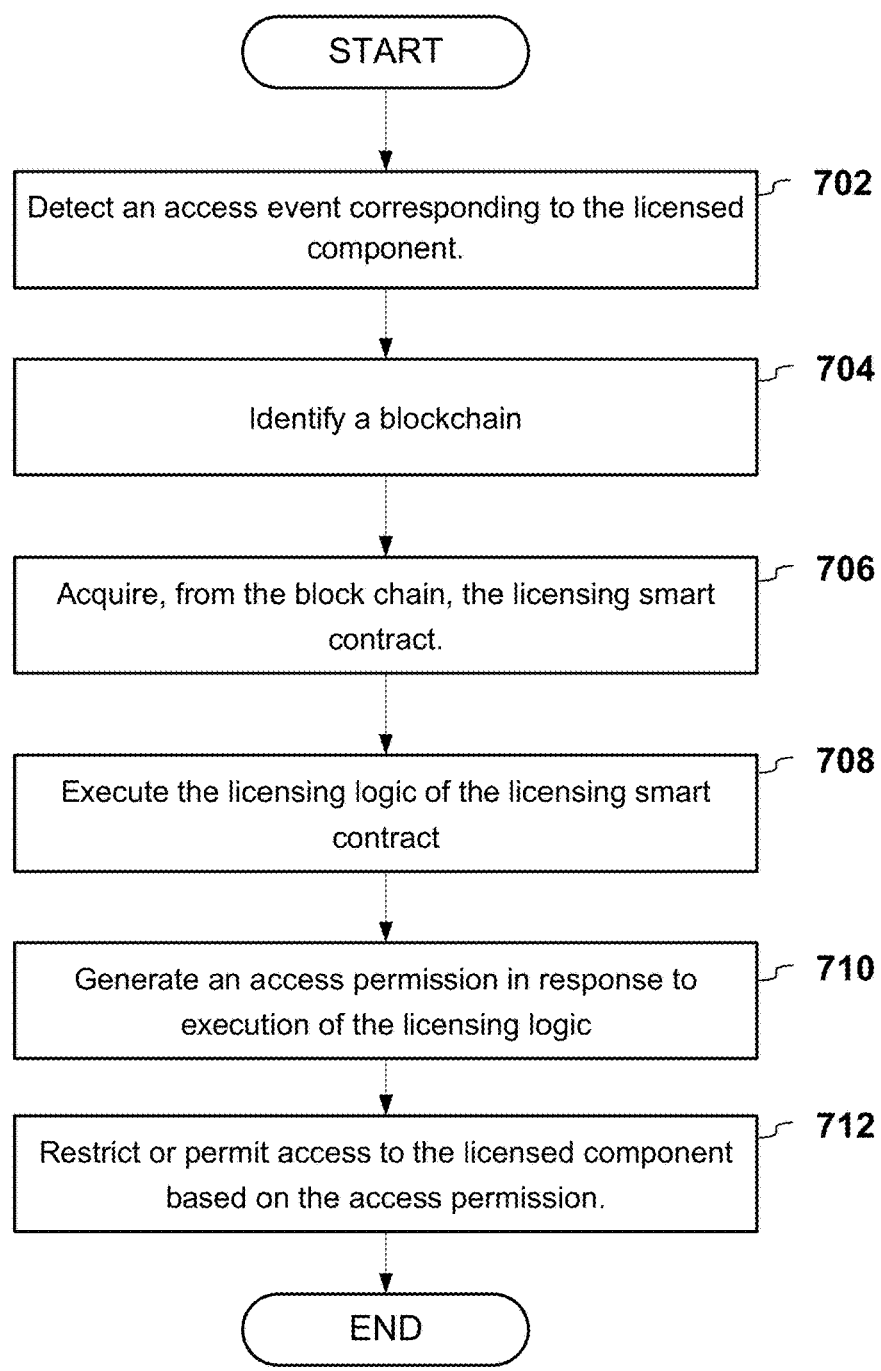
FIG. 7 illustrates a second example of a flow diagram of logic for a system.

FIG. 7 illustrates a second example of a flow diagram of the logic for the system 100. The token manager 118 may detect an access event corresponding to the licensed component 104 (702). For example, the token manager 118 may receive an access message from the remote device 102, the permission service 106, the licensed component 104, and/or any other component configured to monitor access to the licensed component 104. As previously described, the access message may include a message or API call that includes information, such as an access event, indicative of the licensed component, or any feature provided by the licensed component 104, being accessed, controlled, toggled, activated, installed, uninstalled, and/or communicated with. Alternatively or in addition, the access message may be indicative of a request to access control, toggle, activate, install, uninstall, and/or communicated with the licensed component 104.

The token manager 118 may identify the blockchain 114 (704). For example, the token manager 118 may query the blockchain database 112 for the blockchain 114. In some examples, the blockchain database 112 may include a plurality of blockchains. Each of the blockchains may correspond to individual companies, individual product lines, individual license factories, individual licenses, and/or individual licenses components. In some examples, the access message may include identifying information, such as identifying information of a company, product line, license factory, license, and/or the licensed component 104. The token manager 118 may identify the blockchain 114 based on the identifying information. For example, the token manager 118 may compare the identifying information with information stored in the genesis datablock of the blockchain 114.

The token manager 118 may acquire, from the blockchain 114, the license smart contract (706). For example, in response to detecting the access event and/or identifying the blockchain 114, the token manager 118 may communicate with the blockchain database 112 to identify a datablock in the blockchain 114 that includes the license smart contract 408. In some examples, the token manager 118 may traverse the blockchain 114 to identify a plurality of datablocks comprising respective license smart contracts previously created. The license smart contracts may have been previously created, for example, using one or more license factory smart contracts and then added to one or more datablocks in the blockchain 114. The token manager 118 may identify, in response to traversing the blockchain 114, the datablock that includes the license smart contract 408 corresponding to the licensed component 104.

The token manager 118 may execute the licensing logic of the license smart contract (708). In some examples, the token manager 118 may combine usage information with the licensing logic (see FIG. 8).

The token manager 118 may generate an access permission in response to execution of the licensing logic (710). In some examples, execution of the licensing logic may provide a validation result that indicates access to the licensed component 104 is either granted or denied. The token manager 118 may generate the access permission based on the validation result. Alternatively or in addition, the execution of the licensing logic may generate the access permission.

The token manager 118 may restrict or permit access to the licensed component 104 based on the access permission. (712). For example, the token manager 118 may cause the remote device 102 to restrict access to the licensed component 104. In some examples, the token manager 118 may communicate the access permission to the remote device 102. The permission service 106 and/or the licensed component 104 may permit or restrict access to the licensed component 104, or features provided by the licensed component 104 based on the communication with the token manager 118.

Figure 8:
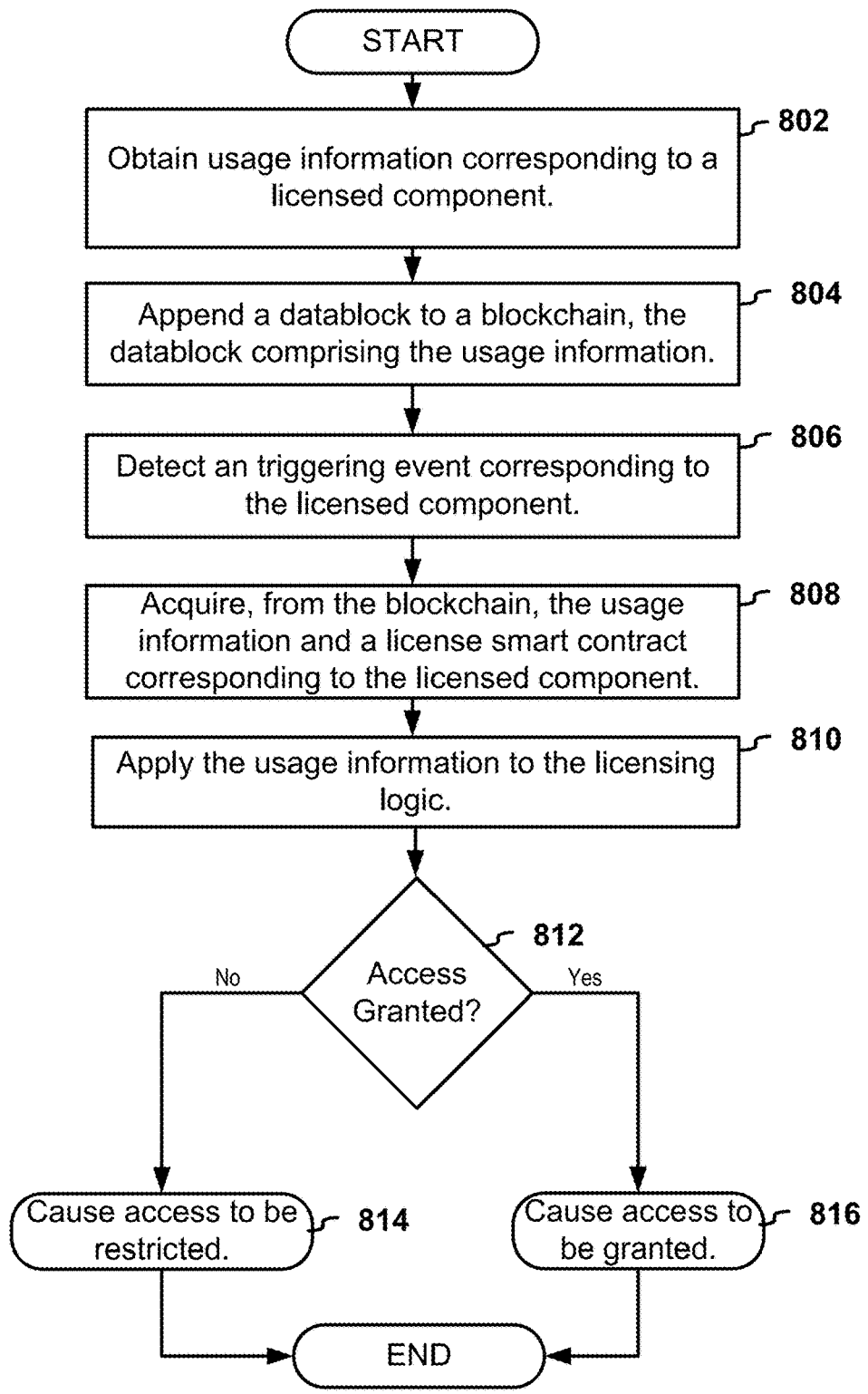
FIG. 8 illustrates a third example of a flow diagram of logic for a system.

FIG. 8 illustrates a third example of a flow diagram of the logic for the system 100. The token manager 118 may obtain usage information corresponding to the licensed component 104 (802). For example, the remote device 102 may send the usage information to the decentralized server node 108. Alternatively or in addition, the token manager 118 may receive the usage information from some other source.

The token manager 118 may append a datablock to the blockchain 114, the datablock comprising the usage information (804). For example, the blockchain 114 may maintain a growing record of usage information. The blockchain 114 may be accessed to acquire the usage information. In some examples, the usage information may be cumulative and the blockchain 114 may maintain a ledger of the usage information. The token manager 118 may access previous usage information stored in one or more previous datablocks to cumulate the amount of usage corresponding to the licensed component 104. In other examples, the usage information stored in the blockchain 114 may be accessed to make additional determinations about the access rights to the licensed component 104. In one example, the token manager 118 may accumulate the total usage time of the licensed component by cumulating usage time indicated in multiple datablocks stored in the blockchain.

The token manager 118 may detect a triggering event corresponding to the licensed component (806). The triggering event may include detection of or receipt of the access event, as described herein. Alternatively or in addition, the triggering event may include any event which causes an evaluation of the access rights to the licensed component 104. For example, the triggering event may include the receipt of the usage information. Alternatively or in addition, the triggering event may include a periodic evaluation of the access rights to the licensed component 104.

The token manager 118 may acquire, from the blockchain 114, the usage information and the license smart contract 408 corresponding to the licensed component 104 (808). For example, in response to detecting the trigger event, the token manager 118 may access the blockchain 114 to acquire information that is used to validate access to the licensed component 104. The license smart contract 408 may include the licensing logic.

The token manager 118 may apply the usage information to the licensing logic (810). For example, the licensing logic may be configured to evaluate the usage information to determine whether to grant access to the licensed component 104. In some examples, the licensing logic may include a procedural operation and the usage information may be supplied to the procedural operation as a parameter. In other examples, the licensing logic may compare the usage information to predetermined threshold values. In one example, the usage information may include a usage time and the predetermined threshold value may include a maximum usage time. The predetermined threshold value, such as the maximum usage time, may be defined in the licensing logic or elsewhere in the license smart contract.

In some examples, the token manager may determine, based on the usage information, a usage metric. The usage metric may include a metric that summarizes an amount of usage of the licensed component. For example, the usage metric may include accumulated use time of the licensed component, the number of times one or more features of the licensed component were accessed, or any other value that quantifies use and/or access to the licensed component. The license logic and/or the token manager 118 may include logic to calculate the usage metric. In some examples, the token manger 118 may include multiple pieces of usage information from separate datablocks included in the blockchain 114. For example, the usage information may have been previously acquired at various times and added to the blockchain 114 in separate datablocks. The usage metric may be calculated based on a combination of the multiple pieces of usage information.

The token manager 118 may determine, based on execution of the licensing logic, whether access is granted to the licensing component (812). In response to access being denied (812, no), the token manager 118 may cause access to be restricted (814). For example, the token manager 118 may communicate a message to the remote device 102, which causes the remote device 102 to restrict access to the licensed component 104. Alternatively, the token manager 118 may determine that access is granted (812, yes). In response to access being granted, the token manager 118 may cause access to the licensed component 104 to be granted. For example, the token manager 118 may communicate with the remote device 102 and cause the remote device to allow access to the licensed component 104.

Figure 9:
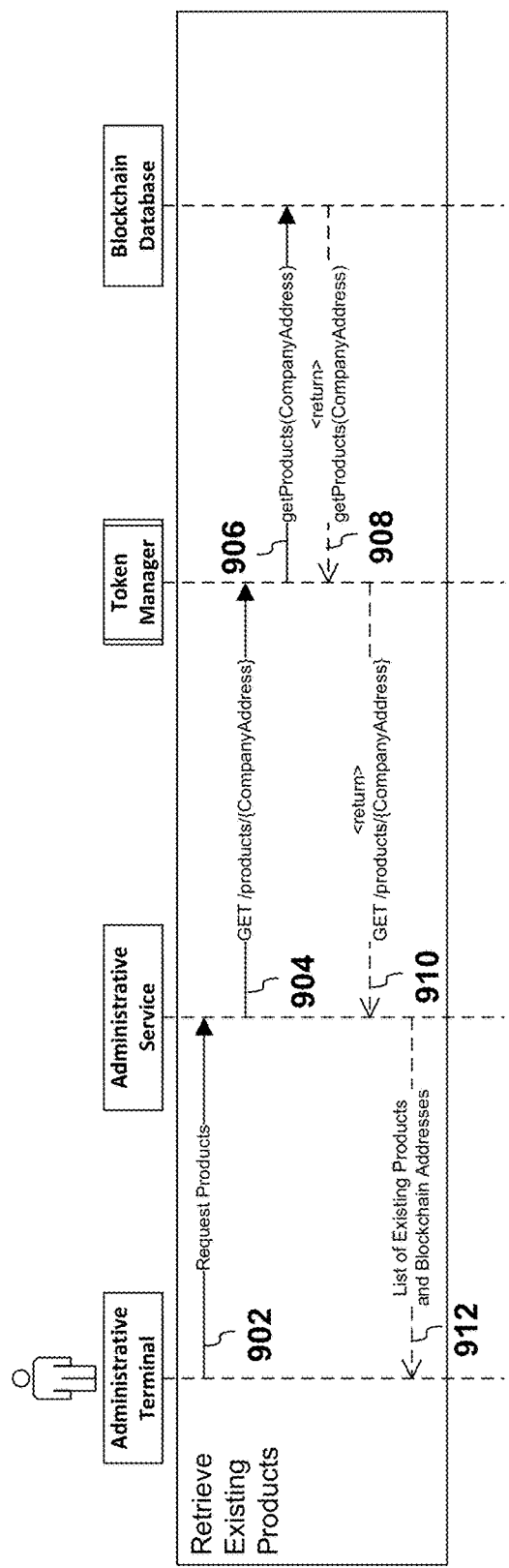
FIG. 9 illustrates a first example of a message sequence diagram for logic of a system.

FIG. 9 illustrates a first example of a message sequence diagram for logic of the system 100. A device, such as an administrative terminal 124, may interact with the administrative service 120 to receive one or more products related to a company (902). A product may refer to a digitally identified product line for hardware, software, or a combination of hardware or software. For example, the product line may refer to a software suite. The company may refer to an identified company. A company may develop, distribute, and/or manage one or more product lines. The administrative service 120 may provide a user interface to the administrative terminal, which allows the vender terminal to view the product lines associated with the company. The user interface may display one or more company identifiers. The administrative terminal may generate a query request for the product lines associated with the company. The request may include the one or more company identifiers selected by a user and/or the administrative terminal.

The administrative service 120 may interact with the token manager 118 to receive the one or more products related to a company (904). For example, the administrative service 120 may communicate a query, such as a HTTP GET request to the token manager 118. In some examples, the query will include one or more company identifiers.

The token manager 118 may communicate with the blockchain database to retrieve one or more company smart contract (906). For examples, the blockchain database 112 may store a plurality of blockchains, each blockchain corresponding to a separate company. In some examples, the genesis datablock for each of the blockchains may include company information that uniquely identifies the company. The token manager 118 may identify the blockchain corresponding to the company by, for example, examining the genesis datablock and comparing the company identifier received from the administrative service 120, or some other source, with the genesis datablock.

The blockchain database 112 may return one or more product smart contracts stored in the blockchain database 112 (908). Depending on the implementation, the blockchain database 112 may return additional or alternative information. For example, the blockchain database 112 may return a datablock, the blockchain 114, the product smart contract 404, and/or reference information, such as pointers, which point to the datablock, blockchain, and/or the product smart contract 404.

The token manager 118 may return product information according to a protocol established between the administrative service 120 and the token manager 118 (910). For example, the token manager 118 may communicate HTML, CSV, or any other type of information that includes the product information and/or the product smart contracts.

The administrative service 120 may provide a list of existing products to the administrative terminal (912). For example, the administrative service 120 may prepare a graphical user interface that displays the products associated with the company on the administrative terminal. In some examples, the information displayed in the graphical user interface may include the addresses of the product smart contracts and/or datablocks stored in the blockchain 114.

Figure 10:
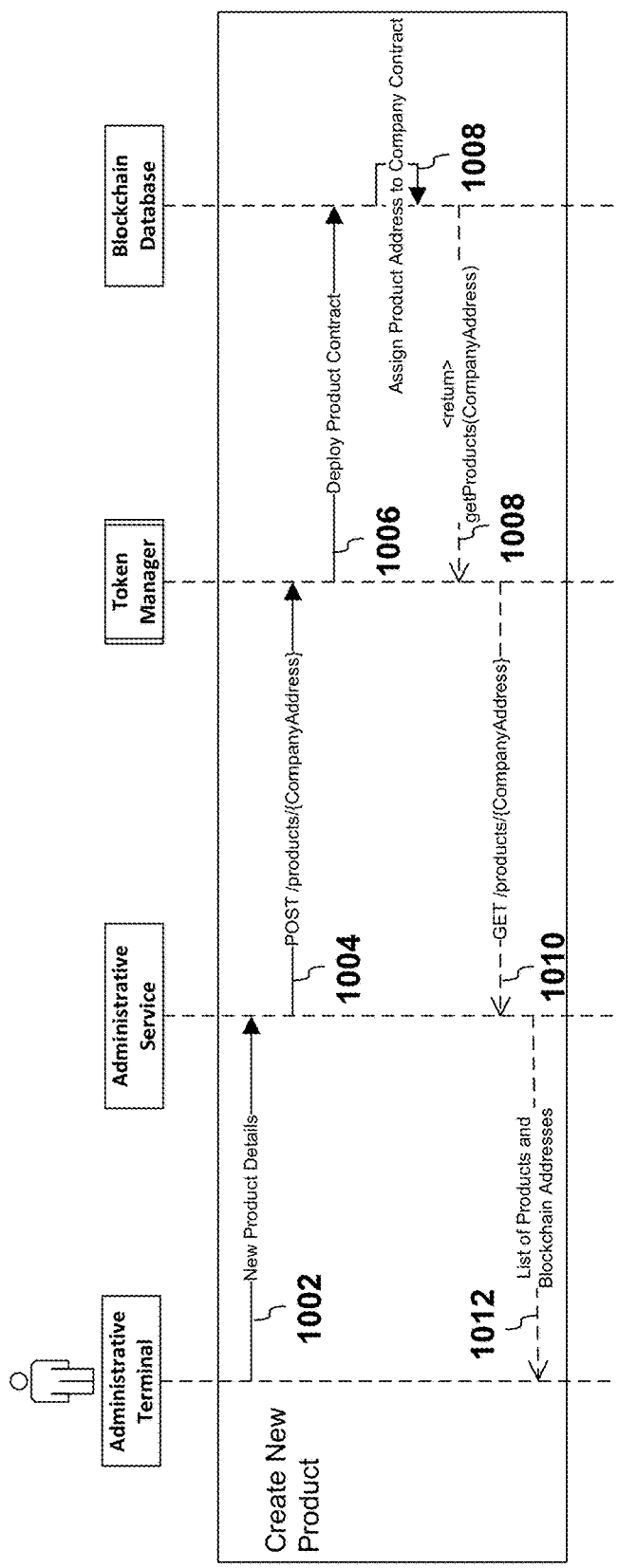
FIG. 10 illustrates a second example of a message sequence diagram for logic of a system.

FIG. 10 illustrates a second example of a message sequence diagram for logic of the system 100. The administrative terminal may communicate product creation parameters to the administrative service 120 (1002). For example, the administrative terminal may display a user interface provided by the administrative service 120. The user interface may accept the product parameters.

The administrative service 120 may communicate a product creation message to the token manager 118 (1004). The product creation request may include the product parameters.

The token manager 118 may communicate with the blockchain database 112 to generate the product smart contract 404 based on the product creation message and/or the product parameters (1006). Alternatively or in addition, the token manager 118 may communicate with the blockchain database 112 to insert a datablock to a blockchain that includes the product smart contract 404.

The blockchain database 112 may assign an address of the product smart contract 404, and/or the datablock including the product smart contract 404, to the company smart contract 402 previously stored in the database (1008). In some examples, the blockchain database 112 (or the token manager 118) may append an additional datablock to the blockchain that includes the updates to the company smart contract 402 (see FIGS. 4-5).

The blockchain database may return the product smart contract and/or information included in the product smart contract to the token manager 118 (1010). The token manager may return the product smart contract and/or information included in the product smart contract to the administrative service 120 (1010). In some examples, the information return to the administrative service from the token manager may be formatted, masked, and/or supplemented according to an API provided by the token manager.

The administrative service may return a list of product information and/or blockchain addresses to the administrative terminal 124 (1012). The administrative terminal may display the product information and/or the blockchain addresses on a user interface.

Figure 11:
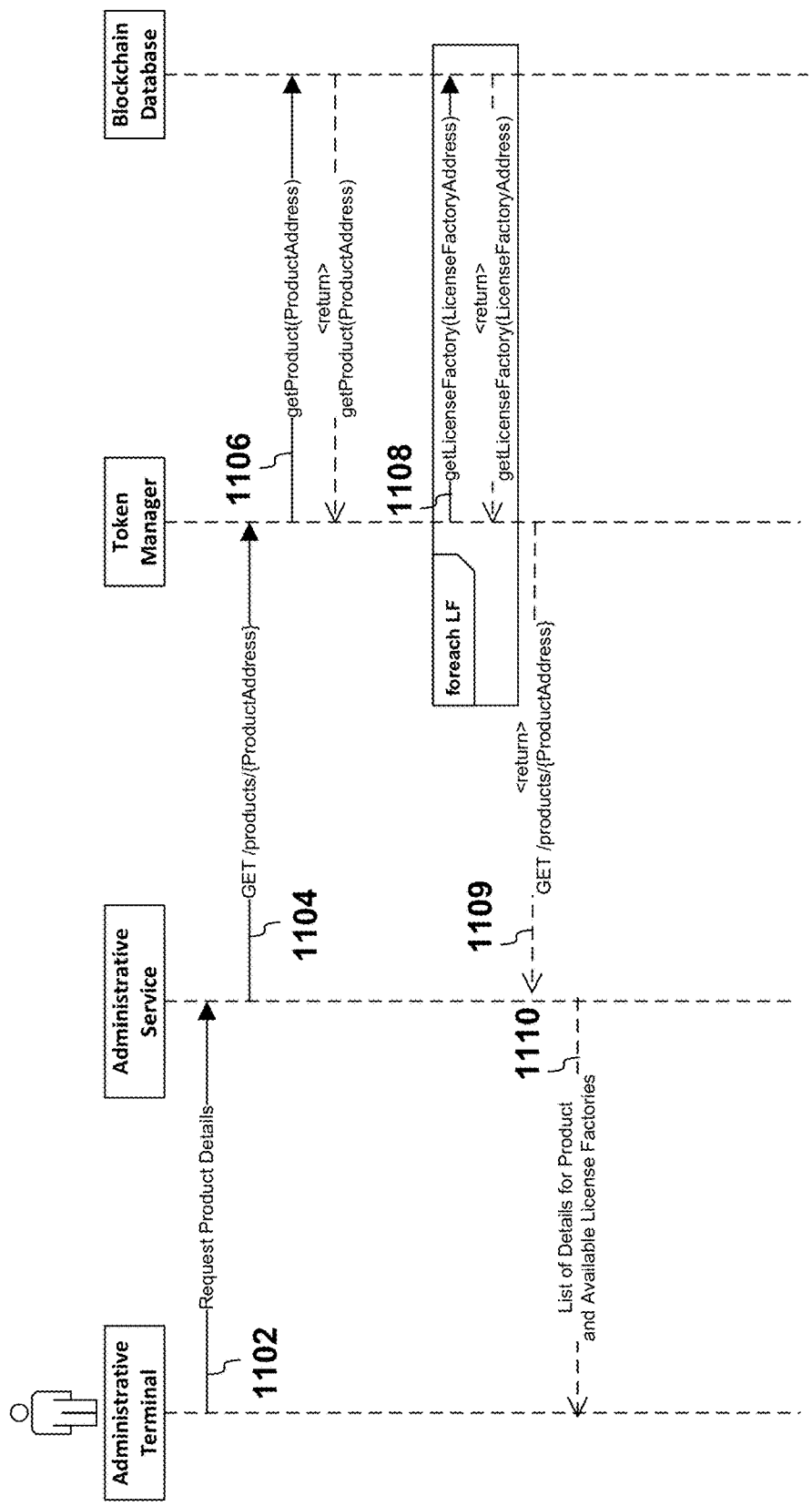
FIG. 11 illustrates a third example of a message sequence diagram for logic of a system.

FIG. 11 illustrates a third example of a message sequence diagram for logic of the system 100. The administrative terminal may request details related to one or more product smart contract (1102). In response to the request, the administrative service 120 may communicate a product identifier to the token manager 118, for example via an HTTP GET operation (1104). The token manager 118 may query the blockchain for the product smart contract 404 (1106). Alternatively or in addition, the token manager 118 may query the blockchain for the license factory(s) associated with the product smart contract 404 and/or the product (1108). The token manager may communicate the license factory(s) and/or information related to the license factory(s) to the administrative service 120 (1109). After the administrative service 120 receives the license factory smart information, the administrative service 120 may format the license factory smart contract(s), and/or information related to the license factory smart contract(s) for display on the vendor device. The administrative service 120 may communicate details for the products available and display information for the license factories smart contract (1110). For example, the using the license factory smart contract(s), the user may provide inputs on the administrative terminal to create and/or customize the license smart contract 408. This may include tailoring the license smart contract 408 for a user or group of users with specific terms, conditions, logic, or any other parameters related to a particular license smart contract.

Figure 12:
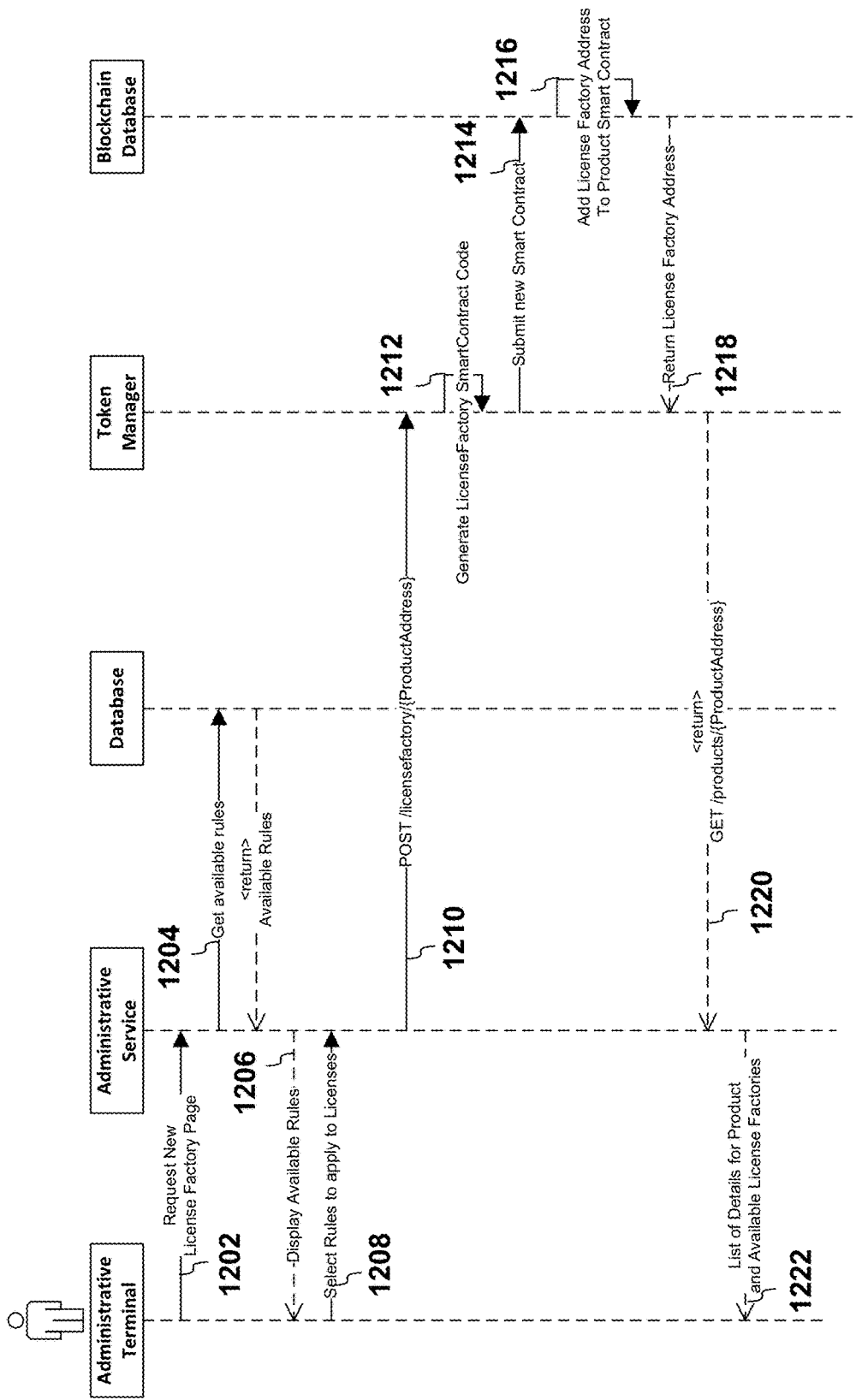
FIG. 12 illustrates a fourth example of a message sequence diagram for logic of a system.

FIG. 12 illustrates a fourth example of a message sequence diagram for logic of the system 100. The administrative terminal may communicate with the administrative service to display a user interface (1202). The administrative service may access the template database 122 to retrieve license factory creation parameters that may be used to create one or more license factory smart contracts (1204). The license factory creation parameters may include rules, definitions, obligations, rights, logic, or any other information that be used to create the license smart contract 408. The administrative service may communicate with the administrative terminal to display the license factory creation parameters.

The administrative terminal (or a user thereof) may select the license factory creation parameters in which to create the license factory smart contract(s) (1208). The selected license factory creation parameters may include the rules, definitions, terms, rights, obligations, and/or self-executing logic that may be included in one or more license smart contracts created using the license factory smart contract(s).

The administrative service may communicate a license factory creation message to the token manager 118 (1210). The license factory creation message may include the license factory creation parameters. The token manager 118 may generate the license factory logic 407 based on the license factory creation parameters (1212). Alternatively or in addition, token manager 118 may generate the license factory smart contract 406. The token manager 118 may communicate with the blockchain database 112 to add the license factory smart contract 406 to the blockchain database 112 (1214). For example, the token manager 118 and/or the blockchain database 112 may generate one or more datablock and add the license factory smart contract 406 to the one or more datablock. In some examples, the blockchain database and/or the token manager 118 may append an additional datablock to the blockchain that records a modification to the product smart contract. For example, the blockchain database may add a datablock to the blockchain that modifies the product smart contract to add the license factory address to the product smart contract (1216).

The blockchain database may return a created license factory and/or information related to the license factory to the token manager 118 (1218). The token manager 118 may communicate the created license factory information to the administrative service (1220). The administrative service 120 may communicate a list of details for products and available license factories to the administrative terminal 124. For example, the administrative terminal 124 may display a user interface that allows selection of products and/or one or more license factories. In one example the user interface may display available license factories in response to selection of a product. The user interface may then allow selection of a license factory. In response to selection of a license factory, the administrative terminal 124 may display fields for template logic included in the selected license factory. The administrative terminal 124 may collect one or more license creation parameters that are input to the field(s) and communicate the license creation parameters to the administrative service 120 and/or the token manager.

Figure 13:
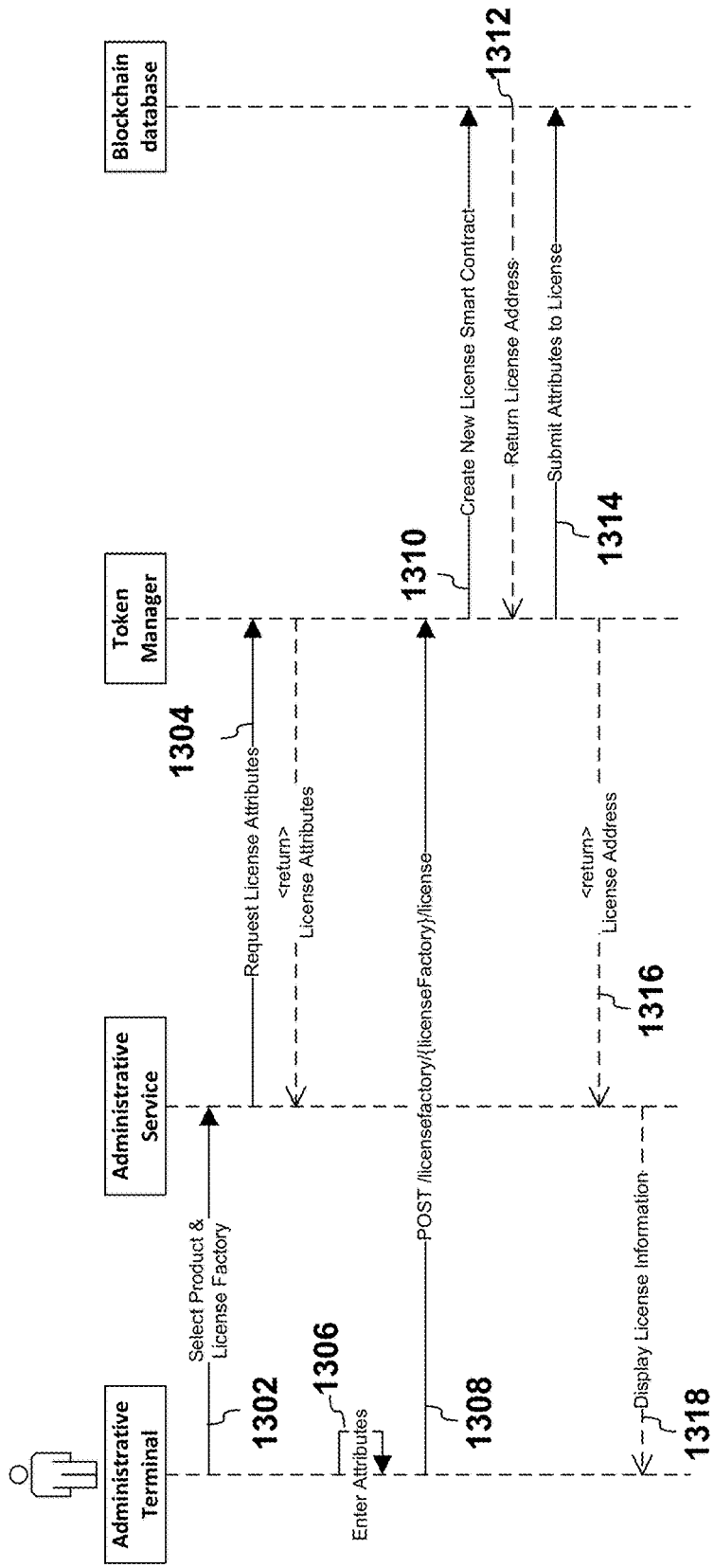
FIG. 13 illustrates a fifth example of a message sequence diagram for logic of a system.

FIG. 13 illustrates a fifth example of a message sequence diagram for logic of the system 100. The administrative terminal may select product information and/or license factory information displayed on the administrative terminal (1302). Based on, for example, the product and/or license factory information selected the administrative terminal, the administrative service 120 may request the product smart contracts and/or the license factory smart contracts stored in the blockchain database 112 (1304). For example, the token manager 118 may retrieve one or more licensing factory contracts. The licensing factory contracts may include logic that generates a license.

The administrative terminal may provide license creation parameters (1306). The administrative terminal may communicate a license creation message to the token manager 118 (1308). Alternatively, the administrative service 120 may communicate the license creation message to the token manager 118. The license creation message may include the license creation parameters. The token manager 118 may create the license smart contract 408 based on the license creation message and/or the license creation parameters.

The token manager 118 may communicate with the blockchain database 112 to add the license smart contract 408 to the blockchain database 112 (1310). For example, the license factory logic 407 of the licensing factory contract may be executed to create the license smart contract 408. The token manager 118 may receive an identifier of the created license smart contract from the blockchain database 112 (1312). In some examples, the licensing parameters may be combined and/or supplied to the license factory logic to generate or modify the license smart contract 408 (1314). In other examples, licensing creation parameters may be obtained from other sources, such as the blockchain database 112, or any other database. The token manager 118 and/or the blockchain database 112 may generate a datablock which includes the license smart contract 408. The token manager 118 and/or the blockchain database 112 may append the datablock to the blockchain 114.

The token manager may return the license smart contract and/or information related to the license smart contract to the administrative service 120 (1316). The administrative may display and/or communicate display information to the administrative terminal 124 (1318). The display information may include the license factory smart contract and/or information related to the license factory smart contract.

Figure 14:
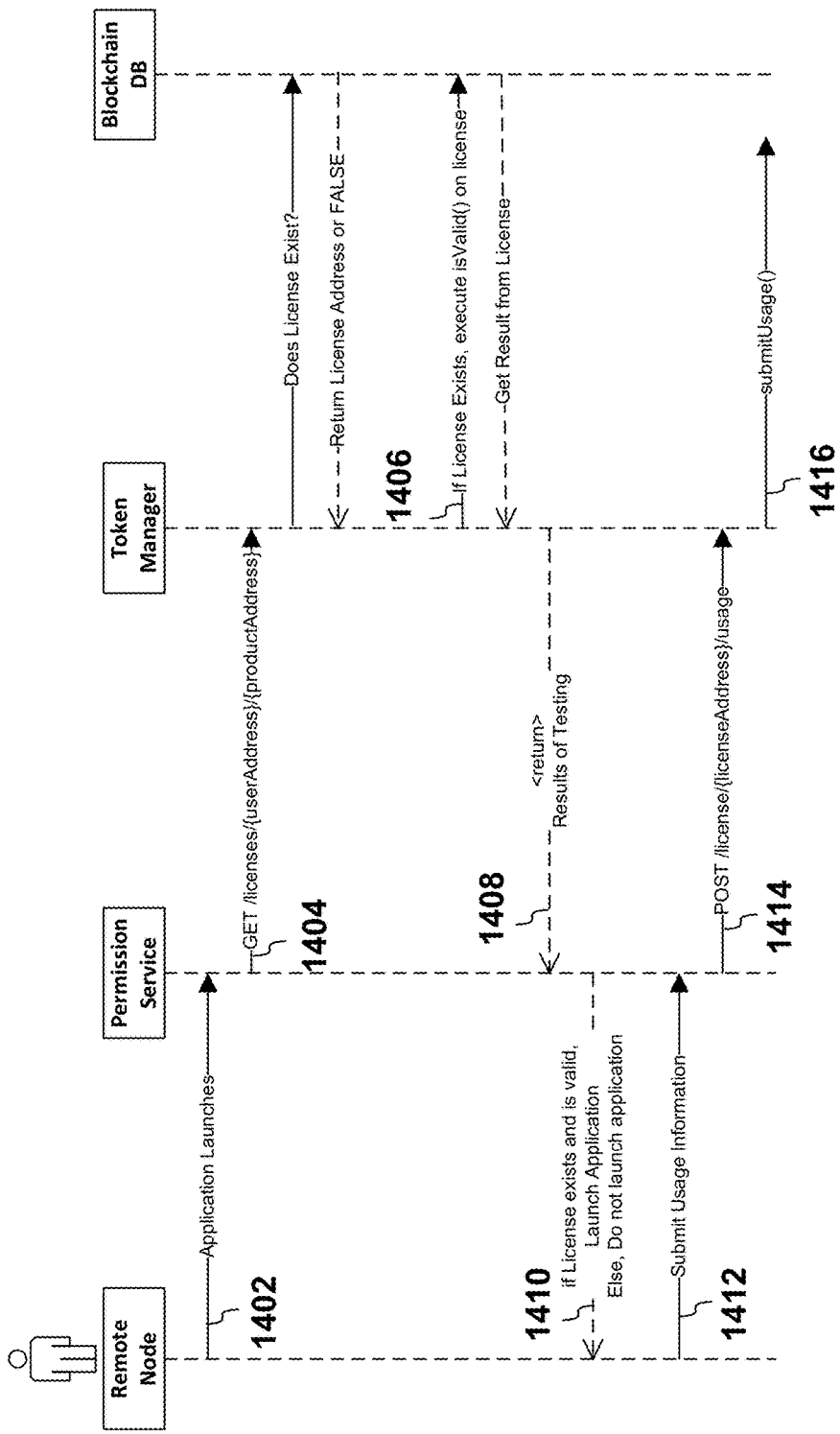
FIG. 14 illustrates a sixth example of a message sequence diagram for logic of a system.

FIG. 14 illustrates a sixth example of a message sequence diagram for logic of a system 100. The licensed component 104, and/or the remote device 102, may communicate an access event (1402). For example, as illustrated in FIG. 14, the access event may be indicative of an application launching on the remote device 102. The permission service 106 may receive the access event. The permission service 106 may communicate an access message to the token manager 118 (1404). The access message may include the parameters descriptive of the access event. The token manager 118 may determine that license smart contract 408 exists by querying the blockchain 114 from one or more datablocks associated with the product identifier. Once the license smart contract 408 is identified, the licensing logic of one or more of the smart contracts may be executed to determine if the license smart contract 408 is valid (1406). In some examples, usage information may be combined with the licensing logic to determine whether the access should be granted or denied.

The token manager 118 may communicate an access permission to the permission service 106 (1408). The permission service 106 may permit or deny access to the licensed component 104 based on the access permission (1410). For example, the permission service 106 may now allow an application to be launched when the access permission is indicative of a denied permission. In another example, the permission service 106 may allow the application to launch in response to the access permission indicating a granted permission.

In some examples, the permission service 106 may acquire usage information corresponding to the licensed component 104 (1412). The permission service 106 may supply the usage information to the token manager 118 (1414). In some examples, the permission service 106 polls for usage information related to the licensed component 104. Alternatively or in addition, the permission service 106 may receive one or more of the license smart contract(s). The license smart contract 408 may indicate the types of information required by the application. In some examples, logic included in the license smart contract 408 may be executed on the end-user device via the intermediate application. The logic of the license smart contract(s) may request or cause the permission service 106 to request usage information from the end user device and/or the licensed component 104. Alternatively or in addition, the logic of the license smart contract(s) may send, or cause the token manager 118 to send, the usage information with the blockchain 114 (1416). The blockchain 114 may store the usage information in a blockchain database 112, a database, or any other storage location.

Figure 15:
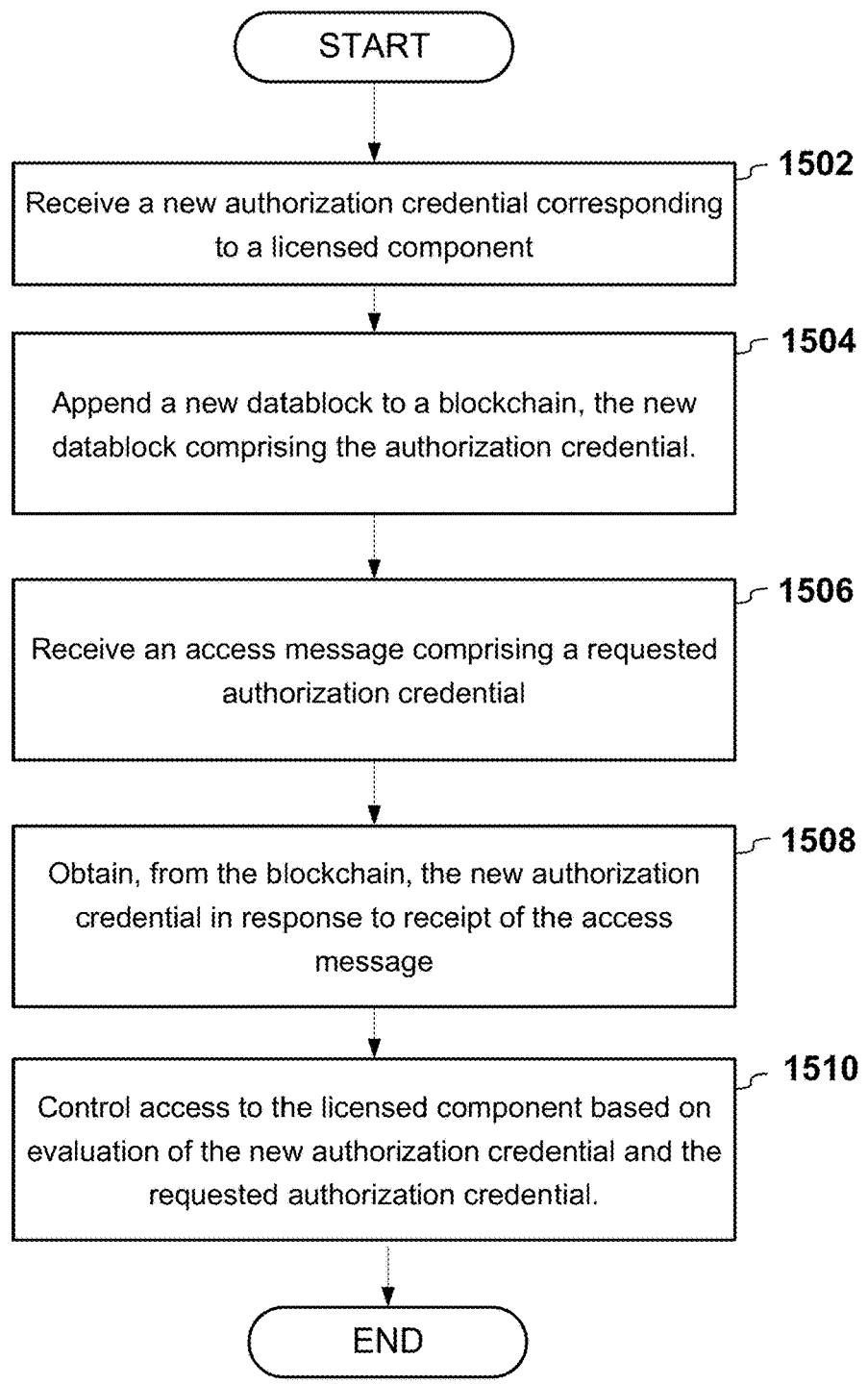
FIG. 15 illustrates a fourth example of a flow diagram for logic of a system.

FIG. 15 illustrates a fourth example of a flow diagram for logic of a system. The token manager 118 may receive a new authorization credential corresponding to a licensed component (1502). An authorization credential may refer to a credential used to prove authorization for accessing the licensed component 104. The authorization credential may include an identifier, a password, or any other type of authorization information. The authorization credential may identify a user, a device, and/or an account of the user and/or device. For example, the authorization may include an IP address, device name, username, account ID, or any other identifying information. Alternatively or in addition, the authorization credential may include the current owner of a self-executing token, such as the license smart contract 408. For example, the blockchain may include a ledger of the historical changes in ownership of the self-executing token.

The token manager 118 may append a new datablock to a blockchain, the new datablock comprising the authorization credential (1504). In response to receiving the new authorization credential, the token manager may update the blockchain. Since the blockchain 114 maintains a historical ledger for the self-executing token, the new credential is added to the block chain 114 while one or more previous credentials remain in the blockchain 114. The one or more previous credentials may be stored in separate datablocks stored in the blockchain that precede the new datablock The token manager 118 may receive an access message comprising a requested authorization credential (1506). The requested authorization credential may include the authorization credential that is being used to access the licensed component. The token manager may obtain, from the blockchain, the new authorization credential in response to receipt of the access message (1508). In some examples, the access message may include an identifier of the self-executing token corresponding to the licensed component 104. The token manager 118 may search the blockchain to identify the most recently added datablock that includes an authorization credential.

The token manager 118 may control access to the licensed component based on evaluation of the new authorization credential and the requested authorization credential (1508). For example, the token manager 118 may compare the requested authorization credential with the new authorization credential. The token manager 118 may grant or restrict access based on the comparison.

The logic illustrated in the flow diagrams may include additional, different, or fewer operations than illustrated. The operations illustrated may be performed in an order different than illustrated.

Figure 16:
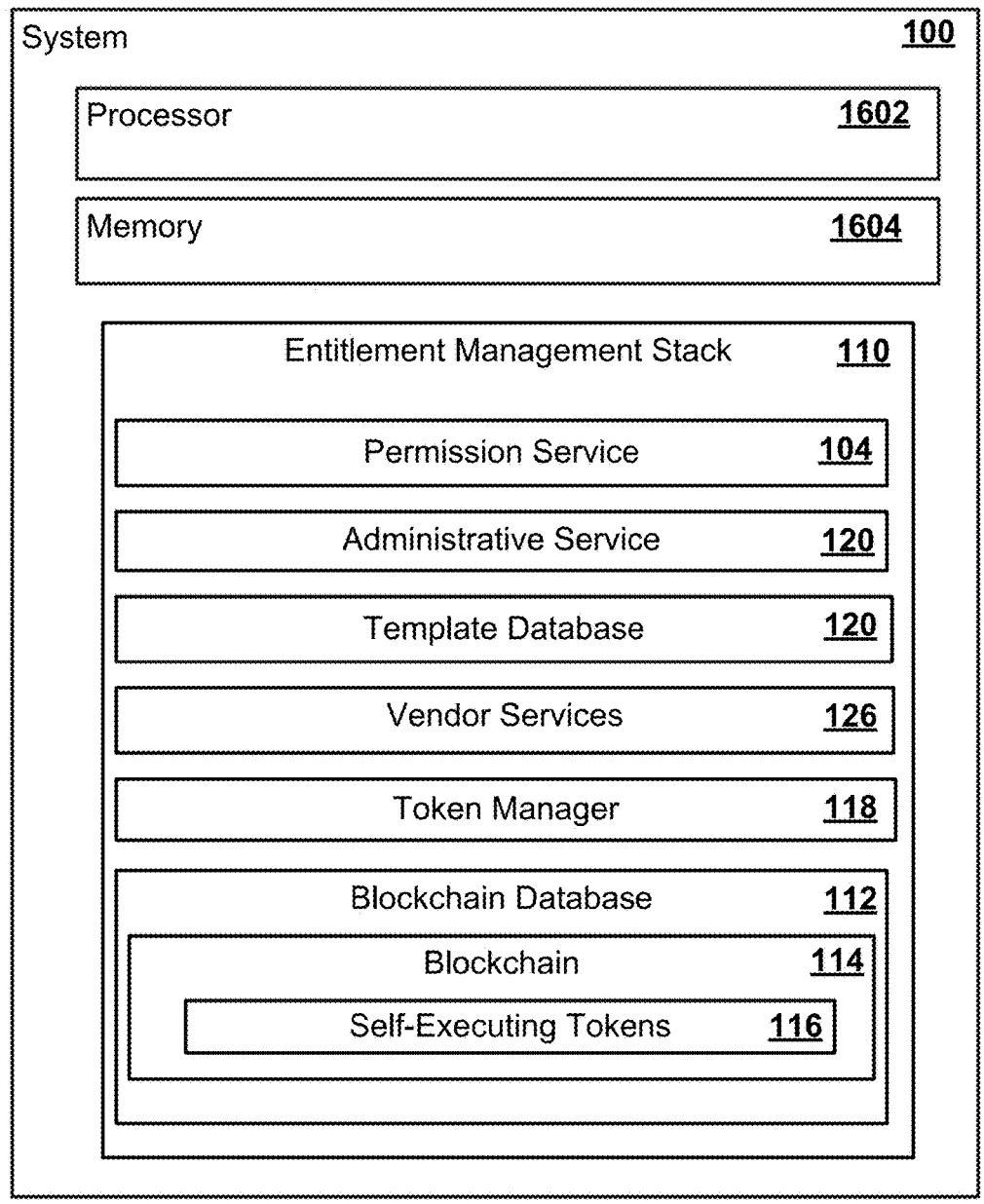
FIG. 16 illustrates an example of a system that includes a memory and a processor.

FIG. 16 illustrates an example of the system 100 that includes a memory 1604 and a processor 1602. The processor 1602 may be in communication with the memory 1604. In one example, the processor 1602 may also be in communication with additional elements, such as a network interface (not shown). Examples of the processor 1602 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 1602 may be one or more devices operable to execute logic. The logic may include computer executable instructions or computer code stored in the memory 1604 or in other memory that when executed by the processor 602, cause the processor 1602 to perform, or cause to be performed, the features implemented by the logic of the entitlement management stack 110, the permission service 104, the administrative service 120, the template database 120, the vendor service 126, the token manager 118, the blockchain database 112, the blockchain 114, the self-executing tokens 116. and/or the system 100. The computer code may include instructions executable with the processor 1602.

The memory 1604 may be any device for storing and retrieving data or any combination thereof. The memory 1604 may include non-volatile and/or volatile memory, such as a random access memory (RAM), a read-only memory (ROM), an erasable programmable read-only memory (EPROM), or flash memory. Alternatively or in addition, the memory 1604 may include an optical, magnetic (hard-drive) or any other form of data storage device.

The system 100 may be implemented in many different ways. For example each component of the system may include a circuit or circuitry. Each circuit or circuitry may be hardware or a combination of hardware and software. The circuitry may include the entitlement management stack 110, the permission service 104, the administrative service 120, the template database 120, the vendor service 126, the token manager 118, the blockchain database 112, the blockchain 114, the self-executing tokens 116. and/or the system 100, and/or other components and subcomponents of the system 100 described herein. For example, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the memory 1604, for example, that comprises instructions executable with the processor 1602 or other processor to implement one or more of the features of the circuitry. For example, the memory 1604 In some examples, the memory 1604 may include at least one of the entitlement management stack 110, the permission service 104, the administrative service 120, the template database 120, the vendor service 126, the token manager 118, the blockchain database 112, the blockchain 114, the self-executing tokens 116. and/or the system 100.

When any one of the circuitry includes the portion of the memory that comprises instructions executable with the processor 1602, the circuitry may or may not include the processor 1602. In some examples, each circuitry may just be the portion of the memory 1604 or other physical memory that comprises instructions executable with the processor 1604 or other processor to implement the features of the corresponding circuitry without the circuitry including any other hardware. Because each circuitry includes at least some hardware even when the included hardware comprises software, each circuitry may be interchangeably referred to as a hardware circuitry.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system 100 or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A computer implemented method using at least one hardware processor comprising:
    communicating display interface instructions configured to cause a terminal to display, on a display interface of the terminal, license parameters indicative of permitted access of a licensed component;
    receiving a request to create a license smart contract, the request including at least one of the license parameters selected on the display interface;
    combining template logic with the at least one of the license parameters to generate a license smart contract comprising license logic, the license logic comprising an instruction to determine when access to the licensed component is permitted;
    appending, to a blockchain, a datablock comprising the license logic;
    receiving usage information indicative of usage of the licensed component;
    accessing, from the blockchain, the license logic in response to receipt of the usage information; and
    controlling, by the hardware processor, based the usage information and on execution of the license logic, access to the licensed component.

2. The method of claim 1, further comprising:
    receiving, from the terminal, a request to display license information corresponding to license smart contracts stored on the blockchain, the request to display license information comprising an account identifier;
    searching datablocks stored on the blockchain for at least one of the license smart contracts that are associated with the account identifier; and
    communicating, to the terminal, license information based on the at least one of the license smart contracts that are associated with the account identifier.

3. The method of claim 1, wherein the license parameters comprise a usage threshold, wherein controlling access to the licensed component comprises:
    comparing, by execution of the license logic, a usage metric of the usage information with the usage threshold; and restricting access to the licensed component in response to the usage metric exceeding the usage threshold.

4. The method of claim 1, wherein controlling, based on execution of the license logic and the usage information, access to the licensed component further comprises:
accessing datablocks from the blockchain, each of the datablocks comprising corresponding usage updates, the corresponding usage updates based on usage information received at multiple previous times;
determining, based on the usage updates and the license logic, access is restricted; and
causing access to the licensed component to be restricted.

5. The method of claim 1, wherein the display interface instructions are further configured to cause the terminal to display product information for a plurality of software products, the method further comprising:
receiving selection information corresponding to the product information, the selection information indicative of at least one of the software products; and
identifying a license factory logic associated with the at least one of the software products, the license factory logic comprising the template logic.

6. The method of claim 1, wherein the display interface instructions are further configured to cause the terminal to display template parameters, the method further comprising:
receiving a selected template parameter from the displayed template selection parameters; and
identifying, in a template database, the template logic based on the selected template parameter.

7. The method of claim 1, wherein the at least one of the license parameters comprise a threshold value, wherein combining the template logic with the at least one of the license parameters to generate the license smart contract further comprises:
generating the license logic, the license logic comprising an instruction to control access to the licensed component based on a comparison of the usage information with the threshold value.

8. The method of claim 1, further comprising:
receiving a request to reassign the license smart contract from a first account identifier to a second account identifier;
generating transfer event information indicative of the license smart contract being re-assigned from a first user to a second user; and
appending a second datablock to the blockchain, the second datablock including the transfer event information.

9. The method of claim 8, further comprising:
authorizing, based on the license logic of the license smart contract, reassignment of the license smart contract, wherein the second datablock is appended to the blockchain in response to the reassignment being authorized.

10. A system comprising:
a memory;
a hardware processor, the hardware processor configured to:
cause a terminal to display license parameters indicative of permitted usage of a licensed component;
receive a request to create a license smart contract, the request including at least one of the license parameters selectable on a display interface of the terminal;
combine template logic with the at least one of the license parameters to generate a license smart contract comprising license logic, the license logic comprising an instruction to determine when usage of the licensed component is permitted;
append, to a blockchain, a datablock comprising the license logic;
receive usage information indicative of usage of the licensed component;
access, from the blockchain, the license logic in response to receipt of the usage information; and
control, based the usage information and on execution of the license logic, access to the licensed component.

11. The system of claim 10, wherein the processor is further configured to:
cause the terminal to display product information for software products;
receive selection information corresponding to the software product information, the selection information indicative of at least one of the software products; and
identify a license factory logic associated with the at least one of the software products, the license factory logic comprising the template logic.

12. The system of claim 10, wherein the processor is further configured to:
cause the terminal to display template parameters;
receive a selected template parameter from the displayed template selection parameters; and
identify, in a template database, the template logic based on the selected template parameter.

13. The system of claim 10, wherein the at least one of the license parameters comprise a threshold value, wherein to combine the template logic with the at least one of the license parameters to generate the license smart contract, the processor is further configured to:
generate the license logic, the license logic comprising an instruction to control access to the licensed component based on a comparison of the usage information with the threshold value.

14. The system of claim 10, wherein the processor is further configured to:
receive a request to reassign the license smart contract from a first account identifier to a second account identifier;
generate transfer event information indicative of the license smart contract being re-assigned from a first user to a second user; and
append a second datablock to the blockchain, the second datablock including the transfer event information.

15. The method of claim 14, wherein the processor is further configured to:
authorize, based on the license logic of the license smart contract, reassignment of the license smart contract, wherein the second datablock is appended to the blockchain in response to the reassignment being authorized.

16. A non-transitory computer readable storage medium comprising:
a plurality of instructions executable by the processor, the instructions comprising:
instructions executable by the processor to communicate display interface instructions configured to cause a terminal to display license parameters indicative of permitted usage of a licensed component;
instructions executable by the processor to receive a request to create a license smart contract, the request including at least one of the license parameters selected on a display interface;
instructions executable by the processor to combine template logic with the at least one of the license parameters to generate a license smart contract comprising license logic, the license logic comprising an instruction to determine when the licensed component is available for use;

instructions executable by the processor to append, to a blockchain, a datablock comprising the license logic;

instructions executable by the processor to receive usage information indicative of usage of the licensed component;

instructions executable by the processor to access, from the blockchain, the license logic in response to receipt of the usage information; and instructions executable by the processor to control, based the usage information and on execution of the license logic, access to the licensed component.

17. The non-transitory computer readable storage medium of claim 16, further comprising:

instructions executable by the processor to cause the display interface to display software product information for a plurality of software products;

instructions executable by the processor to receive selection information corresponding to the software product information, the selection information indicative of at least one of the software products; and instructions executable by the processor to identify a license factory logic associated with the at least one of the software products, the license factory logic comprising the template logic.

18. The non-transitory computer readable storage medium of claim 16, further comprising:

instructions executable by the processor to cause the display interface to display template parameters;

instructions executable by the processor to receive a selected template parameter from the displayed template selection parameters; and instructions executable by the processor to identify, in a template database, the template logic based on the selected template parameter.

19. The non-transitory computer readable storage medium of claim 16, wherein the at least one of the license parameters comprise a threshold value, wherein the instructions executable by the processor to combine the template logic with the at least one of the license parameters to generate the license smart contract further comprise:

instructions executable by the processor to generate the license logic, the license logic comprising an instruction to control access to the licensed component based on a comparison of the usage information with the threshold value.

20. The non-transitory computer readable storage medium of claim 16, further comprising:

instructions executable by the processor to receive a request to reassign the license smart contract from a first account identifier to a second account identifier;

instructions executable by the processor to generate transfer event information indicative of the license smart contract being re-assigned from a first user to a second user;

instructions executable by the processor to authorize, based on the license logic of the license smart contract, the transfer event information; and instructions executable by the processor to append, in response to the transfer event information being authorized, a second datablock to the blockchain, the second datablock including the transfer event information.

* * * * *